US010928535B2

(12) United States Patent
Halliday et al.

(10) Patent No.: US 10,928,535 B2
(45) Date of Patent: Feb. 23, 2021

(54) MARINE VIBRATOR DIRECTIVE SOURCE SURVEY

(71) Applicant: Reflection Marine Norge AS, Bergen (NO)

(72) Inventors: David Fraser Halliday, Cambridge (GB); Jon-Fredrik Hopperstad, Cambridge (GB); Robert Montgomery Laws, Cambridge (GB)

(73) Assignee: Reflection Marine Norge AS, Bergen (NO)

( * ) Notice: Subject to any disclaimer, the term of this patent is extended or adjusted under 35 U.S.C. 154(b) by 394 days.

(21) Appl. No.: 15/571,029

(22) PCT Filed: May 2, 2016

(86) PCT No.: PCT/US2016/030344
§ 371 (c)(1),
(2) Date: Oct. 31, 2017

(87) PCT Pub. No.: WO2016/179060
PCT Pub. Date: Nov. 10, 2016

(65) Prior Publication Data
US 2018/0164461 A1 Jun. 14, 2018

Related U.S. Application Data

(60) Provisional application No. 62/213,064, filed on Sep. 1, 2015, provisional application No. 62/213,046, filed
(Continued)

(51) Int. Cl.
*G01V 1/38* (2006.01)
(52) U.S. Cl.
CPC .......... *G01V 1/3861* (2013.01); *G01V 1/3808* (2013.01); *G01V 2210/127* (2013.01)

(58) Field of Classification Search
CPC ............... G01V 1/3861; G01V 1/3808; G01V 2210/127
See application file for complete search history.

(56) References Cited

U.S. PATENT DOCUMENTS 3,860,928 A * 1/1975 Ehrlich ................ G10K 11/346
342/375
4,176,356 A * 11/1979 Foster ....................... G01S 3/38
342/367
(Continued)

FOREIGN PATENT DOCUMENTS

CN 1203324 C 12/1998
CN 1227634 A 9/1999
(Continued)

OTHER PUBLICATIONS

Abma, R. et al., "Popcorn shooting: Sparse inversion and the distribution of airgun array energy over time", 83rd Annual International Meeting, SEG, Expanded Abstracts, 201, pp. 31-35.
(Continued)

*Primary Examiner* — Ian J Lobo
(74) *Attorney, Agent, or Firm* — Mark H. Whittenberger; Holland & Knight LLP

(57) ABSTRACT

Marine seismic surveys, including ocean bottom surveys, utilizing marine vibrator arrays that are capable of being driven in anti-phase to produce a directional source gradient. Marine seismic surveys may include activating the vibrator array to emit a plurality of radiation patterns with at least a first radiation pattern that has a first notch at a take-off angle that is not close to vertical. Some marine seismic surveys includes emitting directive wavefields from two or more simultaneous seismic source arrays, where the two or more seismic source arrays have a phase that changes from shot-to-shot to allow simultaneous source separation of the directive wavefields.

10 Claims, 15 Drawing Sheets

Related U.S. Application Data on Sep. 1, 2015, provisional application No. 62/155,535, filed on May 1, 2015.

(56) References Cited

U.S. PATENT DOCUMENTS

| | | | |
|---|---|---|---|
| 4,207,622 A * | 6/1980 | Miller | G01S 3/8083 367/126 |
| 4,213,132 A * | 7/1980 | Davidson | H01Q 21/20 342/350 |
| 5,724,241 A | 3/1998 | Wood et al. | |
| 5,971,095 A | 10/1999 | Ozbek | |
| 6,182,014 B1 | 1/2001 | Kenyon et al. | |
| 6,651,007 B2 | 11/2003 | Ozbeck | |
| 7,257,049 B1 | 8/2007 | Laws et al. | |
| 7,492,665 B2 | 2/2009 | Robertsson et al. | |
| 7,817,495 B2 | 10/2010 | Ozbek et al. | |
| 8,456,950 B2 | 6/2013 | Hegna | |
| 8,547,786 B2 | 10/2013 | Griffin et al. | |
| 8,712,694 B2 | 4/2014 | Edme et al. | |
| 9,310,502 B2 | 4/2016 | Ozdemir et al. | |
| 9,594,174 B2 | 3/2017 | Goujon et al. | |
| 10,126,452 B2 | 11/2018 | Halliday et al. | |
| 2002/0118602 A1 | 8/2002 | Sen et al. | |
| 2005/0013194 A1 | 1/2005 | Vaage et al. | |
| 2008/0123467 A1 | 5/2008 | Ronnekleiv et al. | |
| 2008/0192571 A1 | 8/2008 | Vaage et al. | |
| 2008/0275649 A1 | 11/2008 | Ozdemir et al. | |
| 2010/0039892 A1 | 2/2010 | Ray et al. | |
| 2010/0211320 A1 | 8/2010 | Vassallo et al. | |
| 2010/0211321 A1 | 8/2010 | Ozdemir et al. | |
| 2010/0211323 A1 | 8/2010 | Ozdemir et al. | |
| 2010/0271904 A1 | 10/2010 | Moore et al. | |
| 2011/0069581 A1 | 3/2011 | Krohn | |
| 2011/0096625 A1* | 4/2011 | Rentsch | G01V 1/36 367/38 |
| 2011/0182140 A1 | 7/2011 | Lambert et al. | |
| 2012/0188845 A1 | 7/2012 | Jeffryes | |
| 2012/0250460 A1 | 10/2012 | Edme et al. | |
| 2012/0316844 A1 | 12/2012 | Shah et al. | |
| 2013/0060544 A1 | 3/2013 | Bakker et al. | |
| 2013/0128696 A1 | 5/2013 | Vassallo et al. | |
| 2013/0135965 A1 | 5/2013 | Ji et al. | |
| 2013/0182533 A1 | 7/2013 | Rentsch-Smith | |
| 2013/0182536 A1 | 7/2013 | Vassallo et al. | |
| 2013/0329520 A1 | 12/2013 | Van Borselen | |
| 2014/0022860 A1 | 1/2014 | Van Borselen et al. | |
| 2014/0027122 A1* | 1/2014 | Meier | G01V 1/04 166/335 |
| 2014/0029378 A1 | 1/2014 | Van Manen et al. | |
| 2014/0133274 A1 | 5/2014 | Muijzert et al. | |
| 2014/0200812 A1 | 7/2014 | Kitchenside | |
| 2014/0211589 A1 | 7/2014 | Maxwell | |
| 2014/0219055 A1 | 8/2014 | Goujon et al. | |
| 2014/0241117 A1 | 8/2014 | Dellinger et al. | |
| 2014/0269173 A1* | 9/2014 | Coste | G01V 1/006 367/15 |
| 2014/0278116 A1 | 9/2014 | Halliday et al. | |
| 2014/0278119 A1 | 9/2014 | Halliday et al. | |
| 2014/0316709 A1 | 10/2014 | Ji et al. | |
| 2014/0334262 A1 | 11/2014 | Brune | |
| 2014/0355379 A1 | 12/2014 | Moldoveanu et al. | |
| 2014/0369161 A1 | 12/2014 | Sallas et al. | |
| 2014/0369163 A1 | 12/2014 | Sallas et al. | |
| 2015/0057938 A1 | 2/2015 | Krohn et al. | |
| 2015/0066374 A1 | 3/2015 | Ji et al. | |
| 2015/0134259 A1 | 5/2015 | Vassallo et al. | |
| 2015/0276955 A1 | 10/2015 | Brune | |
| 2015/0316667 A1 | 11/2015 | Projetti et al. | |
| 2016/0109591 A1 | 4/2016 | Kamil Amin et al. | |
| 2016/0202379 A1 | 7/2016 | Sallas | |
| 2017/0075015 A1 | 3/2017 | Halliday et al. | |
| 2017/0115415 A1 | 4/2017 | Ozbek et al. | |
| 2017/0146673 A1 | 5/2017 | Goujon et al. | |
| 2017/0184746 A1 | 6/2017 | Halliday | |
| 2017/0363756 A1 | 12/2017 | El Allouche et al. | |
| 2017/0363757 A1 | 12/2017 | Halliday et al. | |
| 2018/0143338 A1 | 5/2018 | Halliday | |
| 2019/0004198 A1 | 1/2019 | El Allouche et al. | |
| 2019/0079208 A1 | 3/2019 | Halliday et al. | |

FOREIGN PATENT DOCUMENTS

| | | |
|---|---|---|
| CN | 1306621 A | 8/2001 |
| CN | 1664617 A | 9/2005 |
| CN | 101334483 A | 12/2008 |
| CN | 102053272 A | 5/2011 |
| CN | 102269823 A | 12/2011 |
| CN | 102667528 A | 9/2012 |
| CN | 103329009 A | 9/2013 |
| CN | 103582827 A | 2/2014 |
| CN | 104981715 A | 10/2015 |
| EP | 0310253 A2 | 4/1989 |
| WO | 0209014 A1 | 1/2002 |
| WO | 2008152364 A1 | 12/2008 |
| WO | 2010093652 A2 | 8/2010 |
| WO | 2010093739 A2 | 8/2010 |
| WO | 2013105062 A1 | 7/2013 |
| WO | 2014110330 A1 | 7/2014 |
| WO | 2014/130040 A1 | 8/2014 |
| WO | 2014152106 A1 | 9/2014 |
| WO | 2014177522 A2 | 11/2014 |
| WO | 2014179282 A1 | 11/2014 |
| WO | 2015011160 A1 | 1/2015 |
| WO | 2015109175 A1 | 7/2015 |
| WO | 2015/143189 A1 | 9/2015 |
| WO | 2015168130 A1 | 11/2015 |
| WO | 2016094332 A1 | 6/2016 |
| WO | 2016168280 A1 | 10/2016 |
| WO | 2016179060 A1 | 11/2016 |
| WO | 2016179206 A1 | 11/2016 |
| WO | 2017096081 A1 | 6/2017 |

OTHER PUBLICATIONS

Amundsen, L. et al., "Multicomponent ocean bottom and vertical cable seismic acquisition for wavefield reconstruction", Geophysics, 2010, 75(6), pp. WB87-WB94.

Hampson, G. et al., "Effects of Source and Receiver Motion on Seismic Data", 1990, SEG Technical Program Abstracts, pp. 859-862.

Hopperstad, J. et al., "Fundamental Principles of Isotropic Marine Source Design", B025, 70th EAGE Conference & Exhibition held in Rome, Italy 2008, 5 pages.

Hopperstad, J-F., et al., "Where is the center of a multi-depth marine source array?", 78th SEG 2008 Annual Meeting, Las Vegas, Nevada, USA, pp. 40-44.

Kristiansen, P. et al., "Deepwater OBN—Exploiting data-processing possibilities", SEG Technical Program Abstracts, 2014, pp. 4258-4262.

Linden, D. A., "A Discussion of Sampling Theorems," Proceedings of the IRE, 1959, 47(7), pp. 1219-1226.

Lomb, N. R., "Least squares frequency analysis of unequally spaced data," Astrophysics and Space Science, 1976, 39(2), pp. 447-462.

Mallat, S. et al, "Matching Pursuits with Time-Frequency Dictionaries", IEEE Transactions on Signal Processing, 1993, 41(12), pp. 3397-3415.

Ozbek, A. et al., "Crossline wavefield reconstruction from multicomponent streamer data: Part 2—Joint interpolation and 3D up/down separation by generalized matching pursuit", Geophysics, 2010, 75(6), pp. WB69-WB85.

Ozdemir, A. K. et al., "Interpolation of Irregularly Sampled Data by Matching Pursuit," G025, EAGE Conference & Exhibition held in Rome, Italy 2008, 5 pages.

Paffenholz, J. et al., "Shear Wave Noise on OBS VZ Data—Part II Elastic Modeling of Scatters in the Seabed", Proceedings of the 75th EAGE Conference & Exhibition, 2006, 5 pages.

Papoulis, A., "Generalized Sampling Expansion", IEEE Transactions on Circuits and Systems, 1977, 24(11), pp. 652-654.

(56) References Cited

OTHER PUBLICATIONS

Scargle, J. D., "Studies in Astronomical Time Series Analysis II. Statistical Aspects of Spectral Analysis of Unevenly Sampled Data", Astrophysical Journal, 1982, 263, pp. 835-853.
Schalkwijk, K. M. et al., "Adaptive decomposition of multicomponent ocean-bottom seismic data into downgoing and upgoing P- and S-waves", Geophysics, 2003, 68(3), pp. 1091-1102.
Aki, K. et al., "Quantitative Seismology", New York: Freeman and company, 1980, 10 pages.
Van Dalen, K., "Multi-component acoustic characterization of porous media", PhD thesis, Delft University of Technology, 2011, 174 pages.
Malischewsky, P. et al., "Love's formula and H/V-ratio (ellipticity) of Rayleigh waves", Wave Motion, 2004, 40, pp. 57-67.
Search Report and Written Opinion of International Patent Application No. PCT/US2017/037587 dated Sep. 8, 2017, 17 pages.
International Preliminary Report on Patentability of International Patent Application No. PCT/US2017/037587 dated Dec. 27, 2018, 13 pages.
Office Action received in U.S. Appl. No. 15/624,403 dated Mar. 13, 2019, 11 pages.
International Preliminary Report on Patentability of International Patent Application No. PCT/US2017/037586, dated Dec. 27, 2018, 11 pages.
Office Action Issue in U.S. Appl. No. 15/624,669, dated Aug. 31, 2018, 7 pages.
Search Report and Written Opinion of International Patent Application No. PCT/US2017/037586, dated Sep. 8, 2017, 14 pages.
Search Report and Written Opinion of International Patent Application No. PCT/US2016/030636, dated Aug. 12, 2016, 15 pages.
International Preliminary Report on Patentability of International Patent Application No. PCT/US2016/030636, dated Nov. 16, 2017, 12 pages.
Search Report in related European Patent Application No. 16789960.8 dated Nov. 19, 2018, 3 pages.
Search Report and Written Opinion of related International Patent Application No. PCT/US2015/028002 dated Jul. 24, 2015, 9 pages.
International Preliminary Report on Patentability of International Patent Application No. PCT/US2015/028002, dated Nov. 10, 2016, 7 pages.
Supplementary Search Report of European Patent Application No. 15785227.8, dated Nov. 10, 2017, 3 pages.
Search Report in European Patent Application No. 15785227.8, dated Mar. 12, 2018, 7 pages.
First Office Action and Search Report issued in Chinese Patent Application No. 201580025632.6, dated Mar. 23, 2018, 21 pages with English Translation.
Second Office Action issued in Chinese Patent Application No. 201580025632.6, dated Feb. 21, 2019, 18 pages with English Translation.
Search Report and Written Opinion of International Patent Application No. PCT/US2016/064481, dated Mar. 17, 2017, 18 pages.
International Preliminary Report on Patentability of International Patent Application No. PCT/US2016/064481, dated Jun. 14, 2018, 15 pages.
Search Report in European Patent Application No. 16789874.1 dated Apr. 30, 2019, 4 pages.
Halliday, D. et al., "Full-wavefield, towed-marie seismic acquisition and applications", SEG Technical Program Expanded Abstracts, 2012, pp. 1-5.
International Preliminary Report on Patentability for the equivalent International patent application PCT/US2016/030344 dated Nov. 16, 2017.
First Chinese Office Action issued in related Chinese Patent Application No. 2016800754152 dated Sep. 22, 2019, 10 pages.
Supplementary Partial European Search Report issued in related European Patent Application No. 16871528.2 dated Aug. 19, 2019, 7 pages.
Final Rejection issued in U.S. Appl. No. 15/624,403 dated Oct. 31, 2019, 11 pages.
Extended European Search Report and Exam issued in related European Patent Application No. 16871528.2 dated Jan. 8, 2020, 15 pages.
Notice of Allowance issued in U.S. Appl. No. 15/307,742 dated Jun. 14, 2019 (9 pages).
Are Osen, Lasse Amundsen, Arne Reitan; (1999) Removal of water-layer multiples from multicomponent sea-bottom data. Geophysics ; 64 (3) May-Jun. 1999: 838-851.
Moore, et al., "Simultaneous Source Separation Using Dithered Sources," SEG Las Vegas 2008 Annual Meeting, pp. 2806-2810.
Vassallo, et al., "Crossline Wavefield Reconstruction for Multi-Components Streamer Data: Multichannel Interpolation by Matching Pursuit (MIMAP) Using Pressure and Its Crossline Gradient," Geophysics, Nov.-Dec. 2010, vol. 75, No. 6, Society of Exploration Geophysicists, pp. WB53-WB67.
International Search Report and Written Opinion for the equivalent International patent application PCT/US2016/030344 dated Sep. 21, 2016.

* cited by examiner

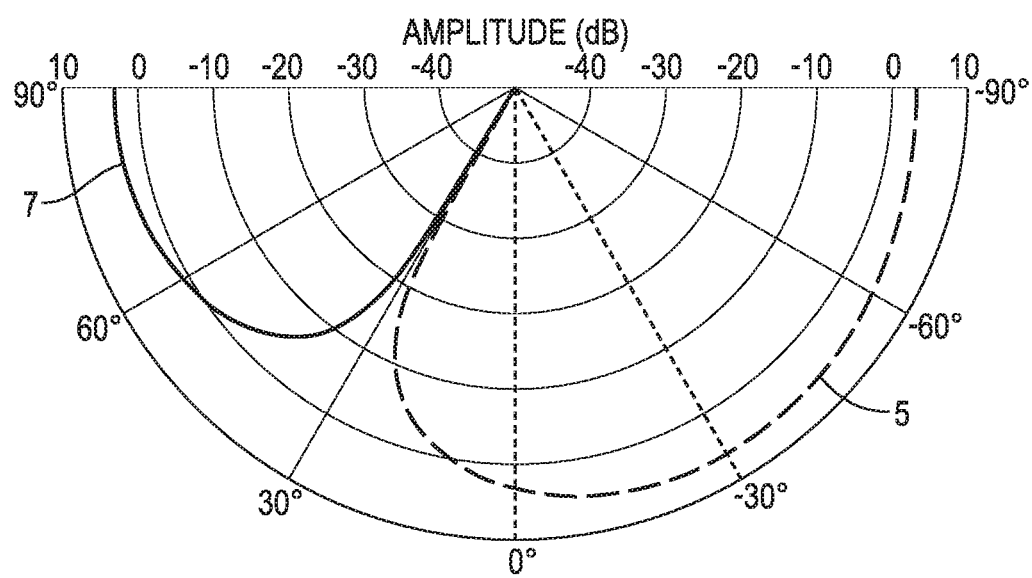
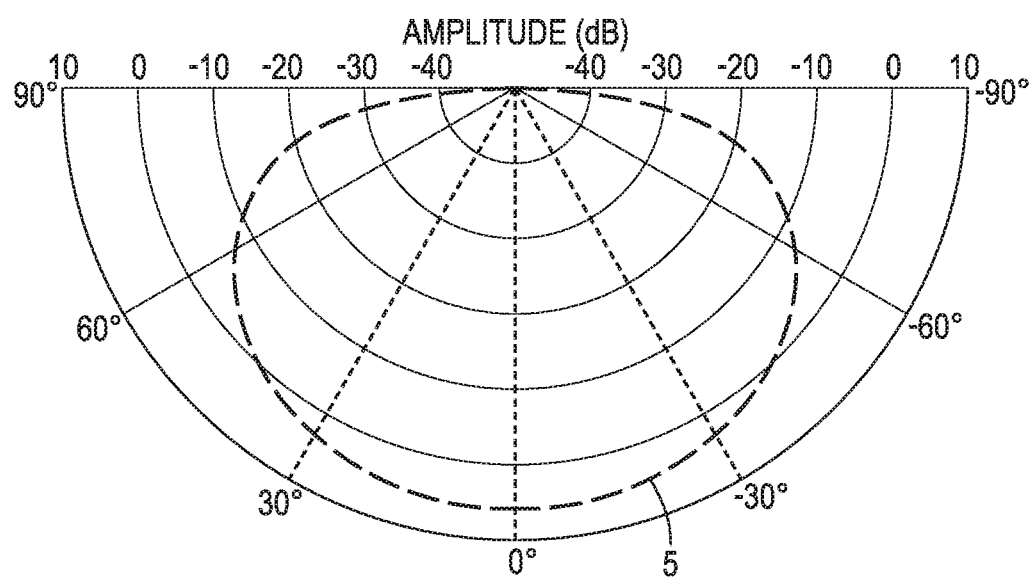

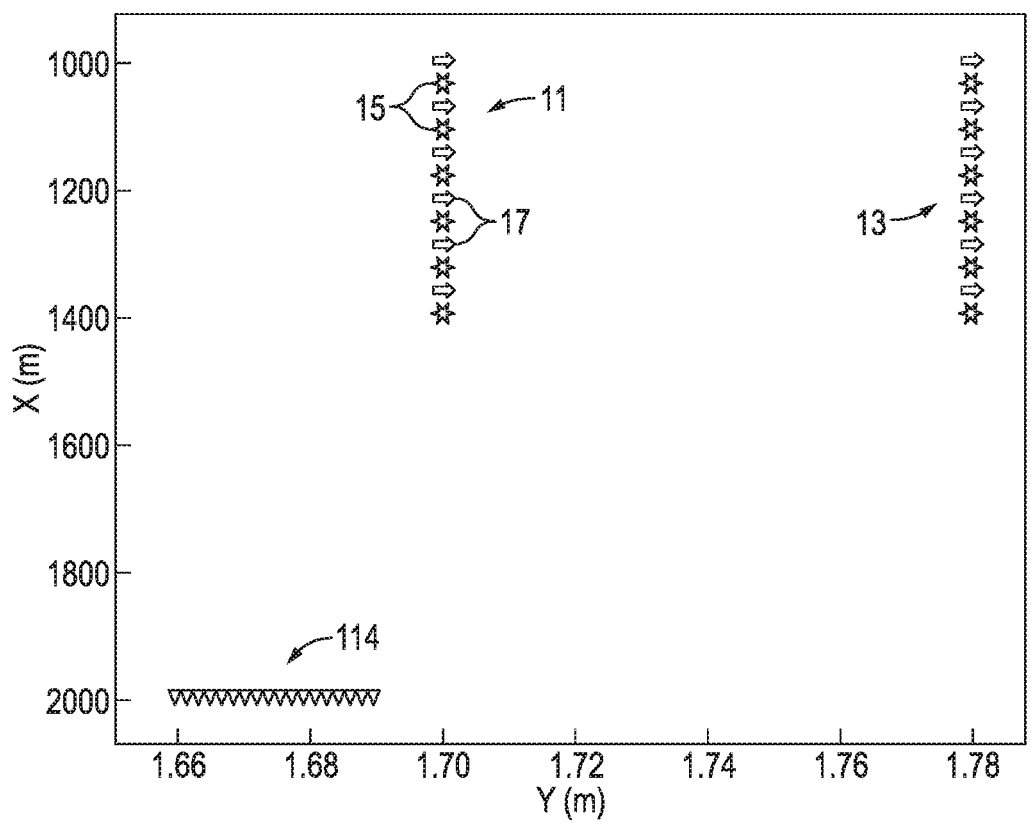

MARINE VIBRATOR DIRECTIVE SOURCE SURVEY

CROSS-REFERENCE TO RELATED APPLICATIONS

This application claims the benefit under 35 U.S.C. § 119(e) of U.S. Provisional Application No. 62/155,535 filed on May 1, 2015, No. 62/213,046 filed on Sep. 1, 2015, and No. 62/213,064 filed on Sep. 1, 2015, all of which are hereby incorporated by reference.

BACKGROUND

This section provides background information to facilitate a better understanding of the various aspects of the disclosure. It should be understood that the statements in this section of this document are to be read in this light, and not as admissions of prior art.

In order to discover and/or evaluate subsea formations for the purpose of hydrocarbon extraction, marine seismic surveys can be used. One form of marine seismic survey is called a towed steamer survey. In that, boats tow long streamers that have sensors located thereon, a source creates an impulsive wave that travels down through the water and into the formation thus reflecting and reverberating, and the reflections and reverberations travel back through the water and are detected by the sensors on the streamers. The data generated from the detected signals at the streamers can be used to evaluate features of the formation and to present a visual representation of the formation that can be used to determine the presence of various features including hydrocarbon deposits.

Another form of survey is known as an ocean bottom seismic (OBS) survey. Similar to the towed streamer survey an impulsive source is used, but instead of streamers being towed by a boat, sensors are placed directly onto the seafloor. The sensors on the seafloor can be nodal (cabled or independent), or can be in the form of seabed sensor cable (similar to streamers). The sensors detect the reflections and reverberations thus generating data that can be analyzed and presented to show various features of the formation.

Seabed surveys are generally accepted as beneficial with respect to quality of data in comparison to towed streamer surveys. This is especially the case in deep water. However, for various reasons, OBS surveys are quite (often magnitudes) more expensive and time consuming than towed steamer surveys. As a result, commercially there is a strong bias toward towed streamer surveys outside of special circumstances where OBS survey data is needed. According to various combinations of embodied features herein some of these associated issues are addressed, including efficiency in cost and operation.

SUMMARY

A method according to aspects of the disclosure includes selecting a marine vibrator array that is capable of being driven in anti-phase to produce a directional source gradient, determining a resolution for a seismic ocean bottom survey (OBS) and designing the seismic OBS based on the selected marine vibrator array to achieve the determined resolution.

A marine seismic survey method according to an aspect of the disclosure includes activating a vibrator array of two or more marine vibrators to emit a plurality of radiation patterns with at least a first radiation pattern that has a first notch at a take-off angle that is not close to vertical, and less than a maximum take-off angle of interest, and at least a second radiation pattern that does not have a notch at a take-off angle close to that first notch.

A marine seismic survey method includes emitting directive wavefields from two or more simultaneous seismic source arrays, wherein the two or more seismic source arrays have a phase that changes from shot-to-shot to allow simultaneous source separation of the directive wavefields.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 7A, 7B, 7C and 7D illustrate radiation patterns where the array of sources may consist of more than two marine vibrators, e.g., four vibrators, and where there may be more than two complimentary angles.

FIG. 12 illustrates a geometry to demonstrate the separation of simultaneous source data acquired in accordance to an acquisition method of the disclosure.

DETAILED DESCRIPTION

Figure 1:
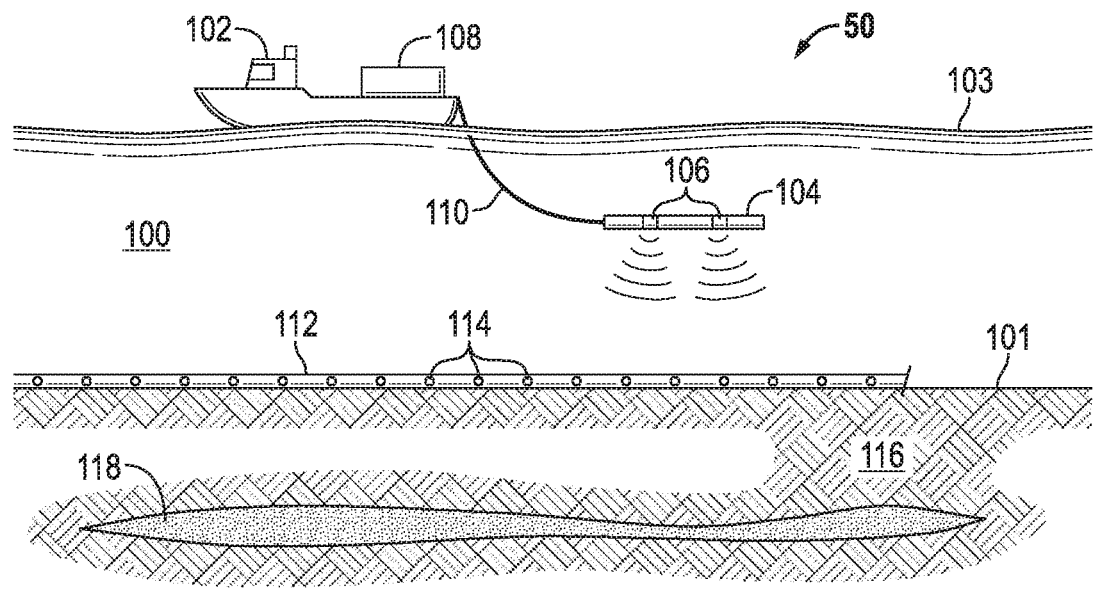
FIG. 1 is a schematic view of a seismic marine survey arrangement that includes a seismic vibrator array and ocean bottom receivers according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Survey equipment including one or more seismic sources and seismic receivers can be used to perform surveying of a target structure. In some examples, the target structure can be a subsurface structure beneath an earth surface. Surveying such a subsurface structure can be performed for various purposes, such as for identifying a subsurface element of interest, including a hydrocarbon-bearing reservoir, a fresh water aquifer, a gas injection zone, or other subsurface elements of interest.

Although reference is made to performing surveying of a subsurface structure, techniques or mechanisms according to some implementations can also be applied to perform surveys of other structures, such as human tissue, plant tissue, animal tissue, a mechanical structure, a solid volume, a liquid volume, a gas volume, a plasma volume, and so forth.

Different types of seismic sources are employed in seismic surveys. For example, a seismic source can include an air gun, which when activated releases compressed air to produce a pulse of acoustic energy. Another type of seismic source is a seismic vibrator, which produces acoustic energy based on oscillating movement of a vibrating element that impacts a structure in the seismic vibrator. The oscillating movement of the vibrating element can be controlled by an activation signal, which can be a sinusoidal wave signal or other type of signal that causes oscillating movement of the vibrating element.

The phase of the activation signal can be controlled for various purposes, such as to perform noise reduction or for other purposes. Generally, a seismic vibrator refers to any seismic source that produces a wavefield in response to an activation signal whose phase can be adjusted independently at each frequency. In particular, the vibrator may be a volumetric seismic source, i.e. it generates a wavefield through changing its volume.

Traditionally, a seismic source (or a collection of seismic sources) is activated such that the seismic source(s) produce(s) an approximately monopolar or omnidirectional source wavefield. A monopolar or omnidirectional wavefield is a wavefield that radiates energy generally equally in all directions. In practice, this directionality is modified by the aperture effect of the source array (since the source array typically includes sources in different horizontal and/or vertical locations), and if the source is located adjacent to the sea surface, the directionality is also modified by the interference effect of the sea surface. To produce an approximately omnidirectional wavefield using a seismic vibrator array that includes multiple seismic vibrators, the seismic vibrators are controlled to be in-phase with respect to each other. For example, if all vibrators are at the same depth, then no two vibrators within the array have a phase difference whose cosine is less than zero. A seismic vibrator array can refer to any arrangement of multiple seismic vibrators.

In accordance with some implementations, in addition to being able to produce an approximately omnidirectional source wavefield, a seismic vibrator array can also be controlled to produce a source gradient wavefield. A source gradient wavefield is a wavefield that has a substantially different radiation pattern to that of the omnidirectional source wavefield. Whereas the omnidirectional source wavefield radiates energy equally in all directions, the gradient source radiates energy with different polarity in different directions. For example, if the gradient source is oriented in the y-direction, then the wavefield will have a positive polarity in the positive y-direction, and a negative polarity in the negative y-direction. The source then has zero-output in at least one direction where the changeover from positive to negative polarity occurs. If the time domain wavefield due to a source at position y1 is defined as S(y1,t), then the gradient of this wavefield in the direction is given as dS(y1,t)/dy. While it may not be possible to generate a wavefield corresponding exactly to this derivative term, this can be approximated as the difference of two omnidirectional sources at the same depth:

$$dS(y1,t)/dy \approx (S(y1+y1,t) - S(y1y,t))/2y \qquad (1)$$

In equation 1, 2 y is the separation between the two omnidirectional sources. Therefore, the source gradient can be generated by locating two or more sources together, and having two or more sources sweeping with opposite polarity (corresponding to the difference in Eq. 1). In this case, the output signals produced by at least two seismic vibrators are 180° out-of-phase, in which case the at least two seismic vibrators are considered to be in anti-phase. In other examples, the at least two seismic vibrators may not be exactly in anti-phase, but the property that the source has different polarity in different directions may still be obtained. For example, this would be the case when the sources are at the same depth, and any two are out-of-phase by an angle whose cosine is less than zero. The source gradient wavefield produced by the omnidirectional sources according to the foregoing configurations is not an idealized mathematical source gradient wavefield. To achieve production of a mathematical source gradient wavefield, the omnidirectional sources would have to be 180° out-of-phase, their separation, 2 y, would have to approach nil, and their amplitudes would have to approach infinity. In practice the output level of the omnidirectional sources cannot approach infinity, so there is a practical trade-off between "close enough" to approximate the idealized mathematical gradient and "far enough" apart to generate useable output level. The "source gradient wavefield" produced by a source array according to some implementations is thus an approximate source gradient wavefield.

In accordance with some implementations, the seismic vibrator array can also be controlled such that the seismic vibrator array is an omnidirectional source that produces an omnidirectional source wavefield. To produce the omnidirectional source wavefield, the seismic vibrators of the seismic vibrator array are controlled such that they are in-phase (with some of the seismic vibrators slightly out-of-phase to account for different positions of the seismic vibrators, e.g. different depths of the seismic vibrators in a body of water, assuming the seismic vibrator array is part of a marine survey arrangement).

Using the seismic vibrator array according to some implementations, greater flexibility is offered since the seismic vibrator array is selectively controllable to be an omnidirectional source or a gradient source. During a survey operation, the seismic vibrator array can be controlled to be an omnidirectional source for some shots, and can be controlled to be a gradient source for other shots, such that a target shot pattern can be developed. A "shot" can refer to an activation of the seismic vibrator array.

FIG. 1 is a schematic diagram of an example marine seismic survey 50 arrangement that includes a marine vessel 102 that tows a seismic vibrator array 104 according to some implementations through a body of water 100. The seismic vibrator array 104 includes seismic vibrators 106 that can be activated in response to activation signals produced by a controller 108 and provided by the controller 108 over a link 110 to the seismic vibrator array 104. In the example of FIG. 1, a series 112 of seismic receivers 114 (sensors) are deployed on the water bottom 101. The receivers 114 may be deployed in a cable or nodal form.

The seismic receivers 114 are configured to detect wavefields reflected from a subsurface structure 116 that is underneath an earth surface (which in FIG. 1 is the water bottom 101, such as the sea floor or sea bottom). The subsurface structure 116 can include one or multiple subsurface elements of interest 118. Source wavefields propagated by the seismic sources 106 are propagated into the subsurface structure 116. The subsurface structure 116 reflects a part of the source wavefields, where the reflected wavefields are detected by the seismic receivers 114. Measured data acquired by the seismic receivers 114 can be communicated to the controller 108 for storage or for processing.

The seismic vibrators 106 in the seismic vibrator array 104 can be controlled to either be in-phase or out-of-phase to cause production of an omnidirectional source wavefield or a source gradient wavefield, respectively, in accordance with some implementations. The controller 108 can send activation signals to the seismic vibrator array 104 to control the seismic vibrator array 104 to produce an omnidirectional source wavefield in a first shot (i.e., first activation of the seismic vibrator array 104) and to produce a source gradient wavefield in a second shot.

In some examples, activation of the seismic vibrator array 104 can be controlled such that a pattern of omnidirectional source wavefields and source gradient wavefields are produced in successive shots. This pattern can be an alternating pattern, where the seismic vibrator array 104 alternates between producing an omnidirectional source wavefield and a source gradient wavefield in successive shots. In other examples, other activation patterns can be produced. Non-limiting examples of wavefield generation using a seismic vibratory array are described in published patent application No. WO 2015/143189, the teachings of which are incorporated herein.

Figure 2:
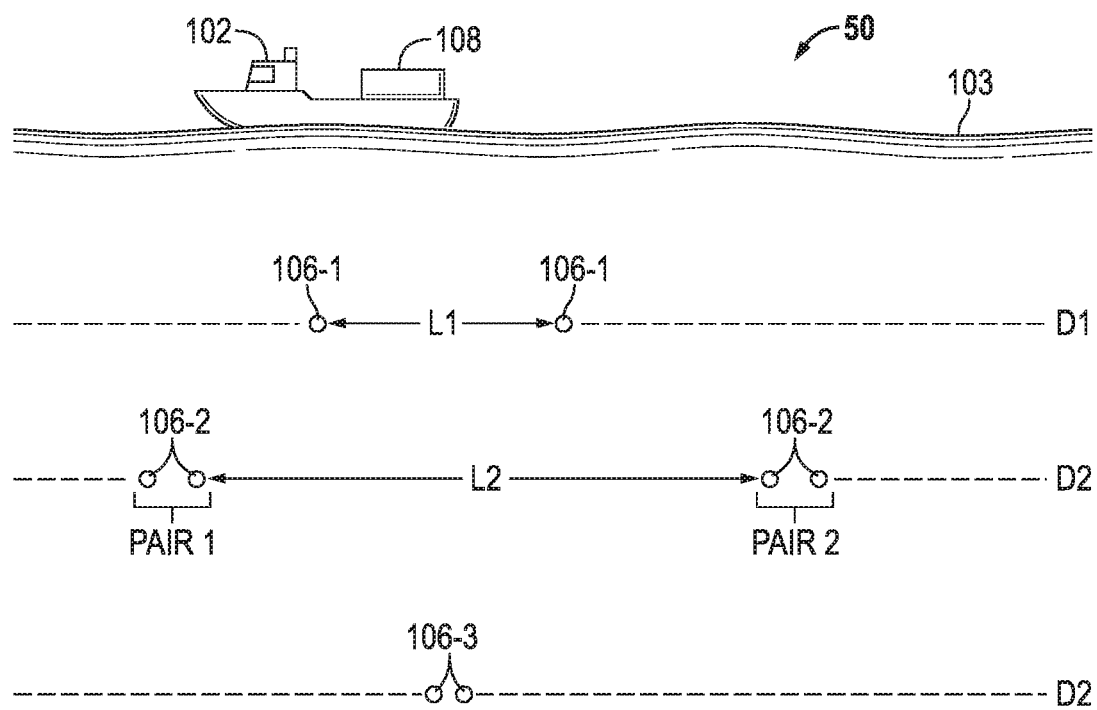
FIG. 2 is a schematic rear view of a marine survey arrangement that includes a seismic vibrator array according to aspects of the disclosure.

FIG. 2 is a schematic diagram of a rear view of the example survey arrangement of FIG. 1. As depicted in the example of FIG. 2, the survey vibrator array 104 includes seismic vibrators at various different depths, D1, D2, and D3. Although seismic vibrators are shown at three different depths in the illustrated example, it is noted that in other examples, the seismic vibrators can be included at less than three depths or at more than three depths. The seismic vibrators at different depths are configured to be activated with activation signals in different frequency ranges. For example, seismic vibrators 106-3 at depth D3 can be configured to be activated using activation signals that sweep from 0 to 15 hertz (Hz). Sweeping an activation signal from a first frequency to a second frequency refers to controlling the activation signal such that the frequency of the activation signal is changed from the first frequency to the second frequency.

Seismic vibrators 106-2 at depth D2 can be configured to be activated using activation signals that sweep from 15 to 25 Hz. Seismic vibrators 106-1 at depth D1 can be configured to be activated by activation signals that sweep from 25 to 100 Hz. In other examples, the activation signals for the seismic vibrators at different depths can be swept in different frequency ranges. More generally, a shallower set of one or more seismic vibrators is swept in a higher frequency range, and a deeper set of one or more seismic vibrators is swept in a lower frequency range.

The seismic vibrators are separated by a separation distance L. The vibrators may be connected to one another by a rigid spacer device. The rigid spacer device may be permanently spaced or may be moveable by way of a contracting and extending device such as a telescoping member or folding member. In some examples, the separation distance L can be ⅓ of the shortest wavelength of interest, and in some implementations, no larger than ½ of the shortest wavelength of interest. The shortest wavelength of interest is dependent on the maximum frequency output by the two or more seismic vibrators, and can therefore vary for different seismic vibrators, such as when deployed at different depth levels as described above. One way to define the shortest wavelength of interest can be to define the maximum take-off angle of interest, θ, which then allows the shortest wavelength of interest to be defined as, $$\lambda\min = \frac{1}{f\max} c \cdot \sin\theta \tag{2}$$

Here, $\lambda\min$ is the shortest wavelength of interested, fmax is the maximum output frequency (e.g. for the current depth level), and c is the velocity of sound in water. The separation distance can therefore change for the vibrators deployed at different depth levels, provided the vibrators at the different levels emit different frequency bands as described. Thus, seismic vibrators 106-1 may be separated by a distance L1, and seismic vibrators 106-2 may be separated by a distance L2.

Each separation distance L1 and L2 is sufficiently large such that a useable output level for the source gradient wavefield is produced, while sufficiently small to retain the characteristics of the idealized mathematical gradient. As noted above, the separation distance can be generally ⅓ of the minimum wavelength of the source gradient wavefield produced by the respective seismic vibrators. In other examples, the separation distance can be greater than ⅓ the wavelength of this minimum wavelength, as long as the separation distance allow for production of a source gradient wavefield.

In the example of FIG. 2, the seismic vibrators 106-3 at depth D3 are driven in-phase. That is to say the relative phase has a cosine that is greater than zero. As a result, the seismic vibrators 106-3 do not produce a source gradient wavefield. Instead, the pair of seismic vibrators 106-3 is configured to produce just an omnidirectional source wavefield.

Although two pairs (Pair 1 and Pair 2) of seismic vibrators 106-2 are shown at depth D2 in FIG. 2, it is noted that in other examples, just two seismic vibrators 106-2 can be provided at depth D2, where these two seismic vibrators are separated by distance L2. Similarly, just one seismic vibrator 106-3 can be provided at depth D3.

To produce an omnidirectional source wavefield using the seismic vibrator array 104 depicted in FIG. 2, the seismic vibrators 106-1, 106-2, and 106-3 are driven to be in-phase. The seismic vibrators 106-1, 106-2, and 106-3 are considered to be in-phase even though the activation signals for the seismic vibrators 106-1, 106-2, and 106-3 may be slightly out-of-phase, with phase delays provided between the respective activation signals to account for depth differences of the seismic vibrators 106-1, 106-2, and 106-3. The net effect of the activation signals that are slightly out-of-phase is that the seismic vibrators 106-1, 106-2, and 106-3 at different depths produce wavefields as if they were driven in-phase.

On the other hand, to produce a source gradient wavefield, the left and right seismic vibrators 106-1 at depth D1 are driven to be out-of-phase (more specifically in anti-phase), and the left pair of seismic vibrators 106-2 and right pair of seismic vibrators 106-2 at depth D2 are also driven to be out-of-phase (more specifically driven anti-phase).

Causing the seismic vibrators to be out-of-phase can be accomplished by sweeping the seismic vibrators to be in anti-phase (or close to anti-phase, for example, to preserve energy output, or to account for depth differences). Sweeping seismic vibrators in anti-phase refers to activating a first of the seismic vibrators using an activation signal that is in anti-phase with respect to an activation signal used to activate another of the seismic vibrators. The seismic vibrators sweeping in anti-phase are separated by a suitable distance (such as further described above) to generate a source gradient signal. As noted above, the separation distance is frequency dependent, with an example of the separation distance being ⅓ of the minimum wavelength of the source gradient wavefield.

In the discussion above the gradient wavefield is generated using wavefields that were approximately in anti-phase and where the separation between the source elements met a criterion that ensured the wavefield had the necessary gradient-type properties. In accordance to embodiments of this disclosure, the directivity patterns are controlled using combinations of phases that vary from shot-to-shot and frequency-to-frequency in order to produce complimentary wavefields. The directivity can also be controlled by varying the separation of the source elements.

These directive wavefields may have a number of characteristics, such as, the emitted wavefield has at least one notch (close to zero output energy) at one or more take-off angles other than close to the vertical, but less than the maximum take-off angle of interest. For example, greater than 5 degrees take-off angle and less than 45 degrees take-off angle, where for a particular survey, 45 degrees is the maximum take-off angle of interest; and each emitted wavefield has one or more complementary wavefields, where the complimentary wavefield does not have a notch that coincides with a notch in the other wavefields.

Figure 3A:
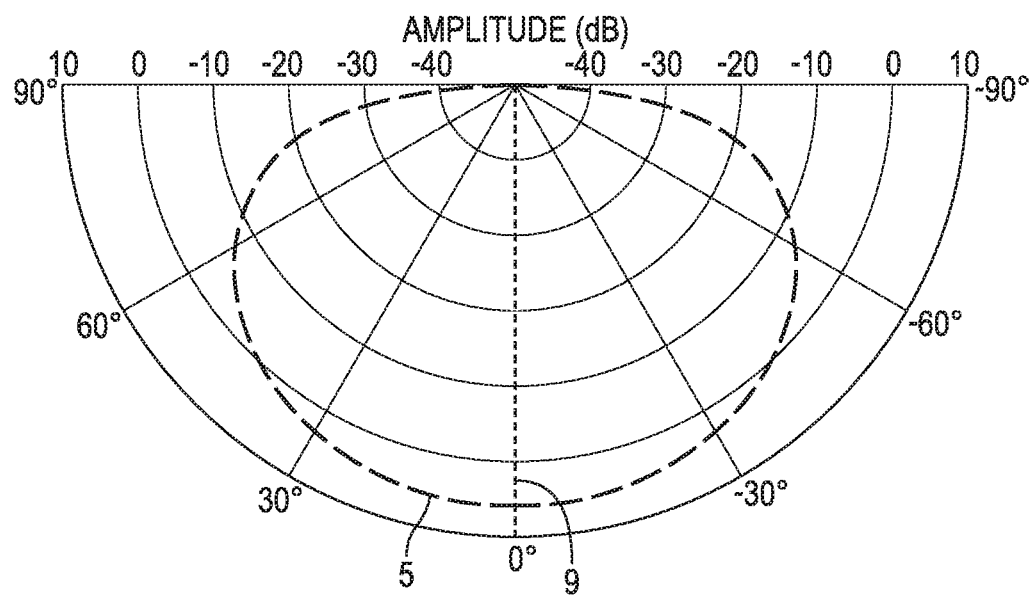
FIGS. 3A and 3B illustrate radiation patterns as a function of take-off angle for an omnidirectional source in FIG. 3A and a source gradient in FIG. 3B.
Figure 3B:
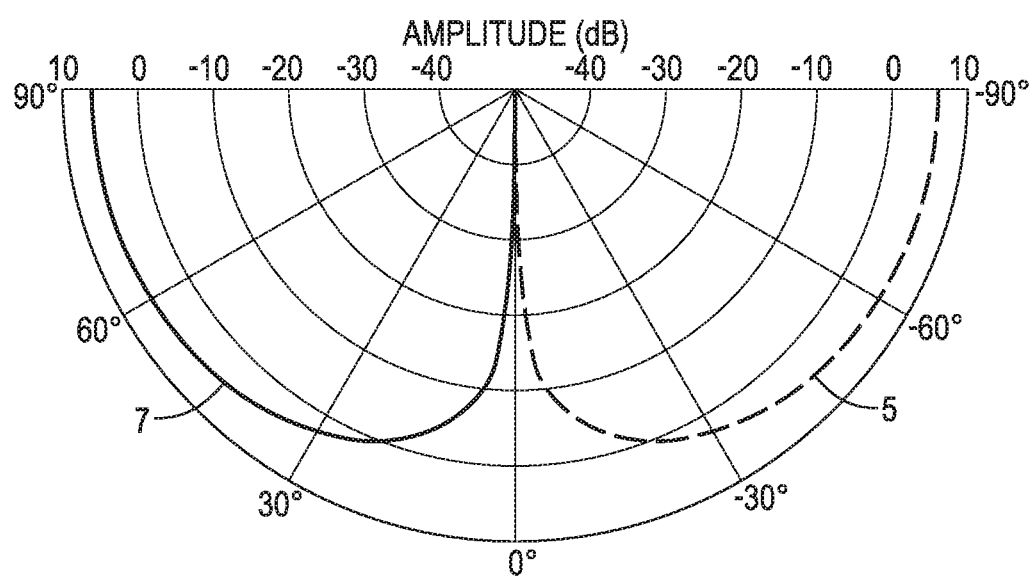

Using an array of marine vibrators, the directivity of the output wavefield can be controlled by varying the relative phase of the vibrators within the array, and also by varying the distance between the vibrator elements within the array. Consider for example the case of an array consisting of two vibrators, for example vibrators 106-1 at depth D1 in FIG. 2. If the vibrators are separated by a distance L1 of 15 m in the crossline direction the radiation pattern for an output frequency of 50 Hz, observed in the crossline direction, is shown in FIGS. 3A and 3B. At this frequency, 15 m corresponds to half of the longest wavelength in the data. The amplitude response of the omnidirectional source (as a function of crossline take-off angle) is shown in FIG. 3A, and the response of the source gradient is shown in FIG. 3B. The positive polarities are indicated by reference number 5, and negative polarities are indicated with reference number 7. The gradient emits energy with positive polarity in one direction (positive take-off angles) and with negative polarity in another direction (negative take-off angles). There is a crossover from positive to negative at zero take-off angle. This source gradient is interleaved with the omnidirectional source, which has only positive polarity. The notch at the cross-over point in FIG. 3B is indicated by the black dotted line 9 in FIG. 3A.

Figure 4A:
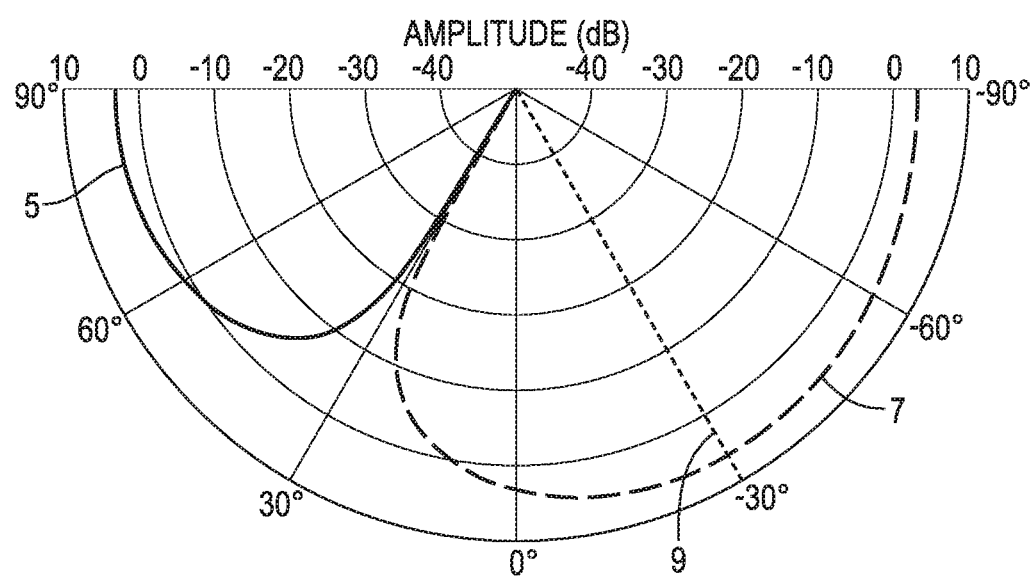
FIGS. 4A and 4B illustrate radiation patterns as a function of take-off angle for a pair of vibrators within an array that is out of phase by −90 degrees in FIG. 4A and a pair of vibrators within an array that is out of phase by +90 degrees in FIG. 4B.
Figure 4B:
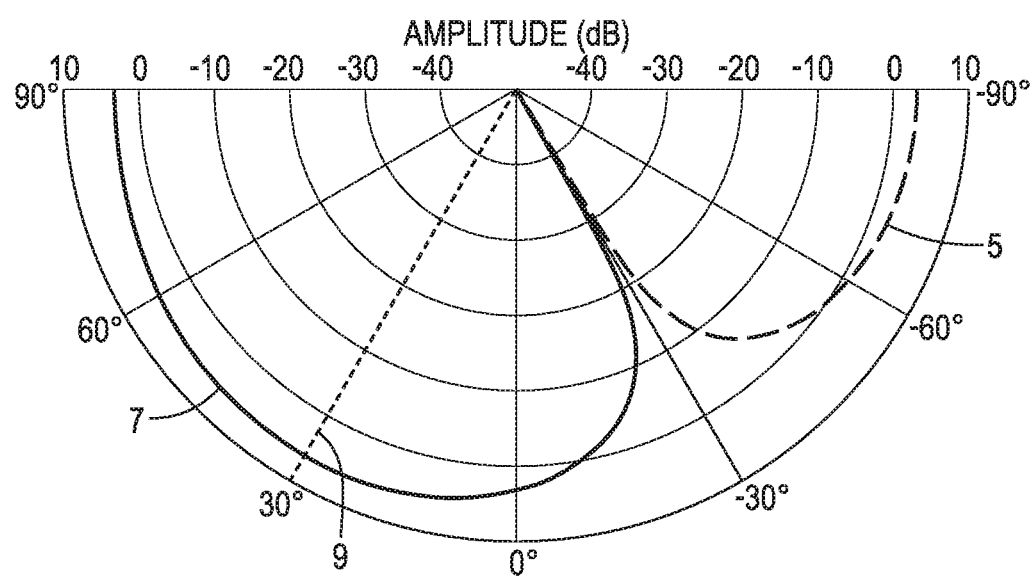

Now, consider a case where neither an omnidirectional source wavefield nor a gradient source wavefield is emitted, but rather wavefields are emitted from each source of the pair of sources that are neither in-phase nor in anti-phase. This produces crossline amplitude responses as shown in FIGS. 4A and 4B. FIG. 4A shows the radiation patters in dB as a function of take-off angle for a pair of vibrators within an array that is out of phase by −90 degrees. FIG. 4B shows the response for a pair of vibrators within an array that is out of phase by 90 degrees. The positive polarity are indicated by the numeral 5, the negative polarity by the numeral 7, and the dotted line 9 indicates the position of the notch on the alternate plot. Note that both responses have a peak where the other has a notch (indicated by the dotted black line 9 on the alternate figure). The notches occur at the point where the polarity changes from positive to negative. Neither of the output curves correspond to an omnidirectional source, and neither correspond to a gradient source, yet they do have similar characteristics, namely variations in the polarity of the emitted wavefield, and notches where the polarity changes from positive to negative. Key characteristics of these two outputs are that they have been designed such that the notches of one output correspond to peaks of the other output, and that the notches occur at the point where the output changes polarity. The notches occur at take-off angles of 30 degrees and −30 degrees. These take-off angles are not close to vertical, and for a particular seismic survey, less than the greatest take-off angle of interest. Such a pair of complimentary outputs can be used for similar applications to omnidirectional and gradient wavefields.

Figure 5A:
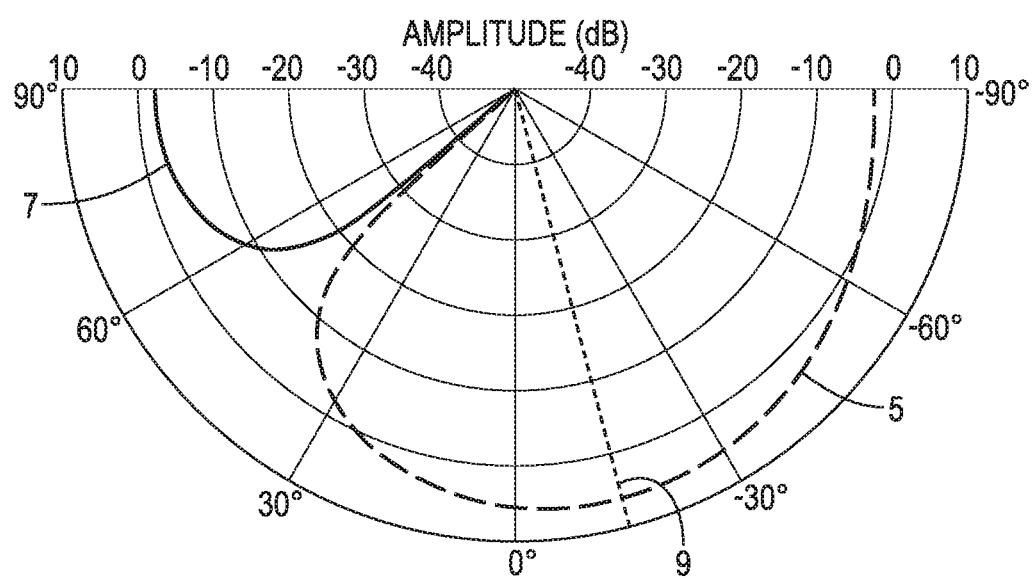
FIGS. 5A and 5B illustrate radiation patterns as a function of take-off angle for a pair of vibrators within an array that is out of phase by −45 degrees in FIG. 5A and a pair of vibrators within an array that is out of phase by +135 degrees in FIG. 5B.
Figure 5B:
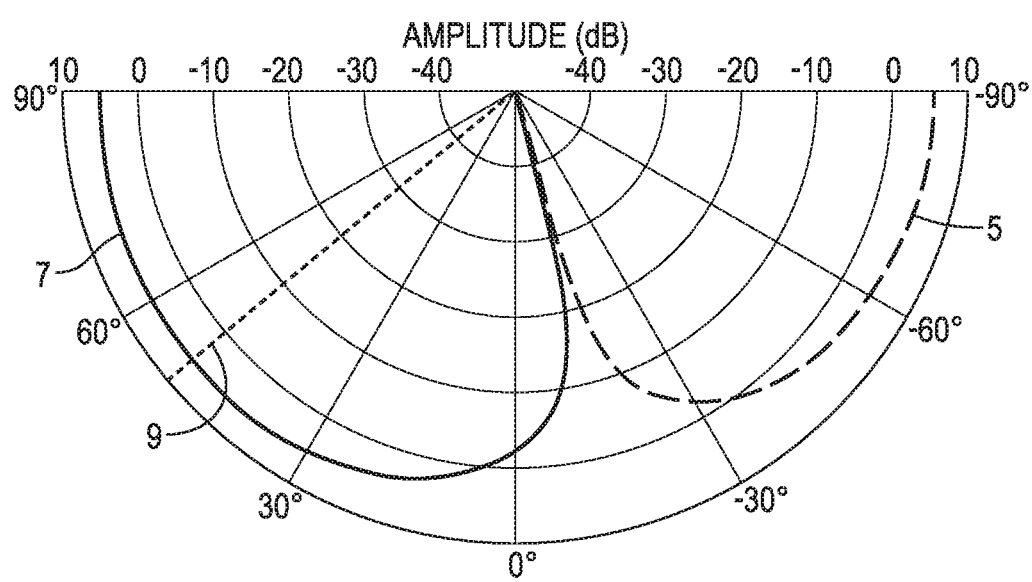

FIGS. 5A and 5B illustrate another example of two outputs that have the similar characteristics, but with the corresponding notch values and peaks occurring at different take-off angles. FIG. 5A illustrates a radiation pattern as a function of take-off angle for a pair of vibrators within an array that is out of phase by negative (−)45 degrees and FIG.

5B illustrates a radiation pattern as a function of take-off angle for a pair of vibrators within an array that is out of phase by 135 degrees. Again, these two outputs correspond neither to an omnidirectional source nor to a source gradient. In this case the notches occur at approximately negative (−)15 degrees and 50 degrees respectively. Both of these take-off angles correspond to peaks in the alternate radiation pattern (black dotted lines 9). While one of these notches occurs at a take-off angle that may be larger than the largest angle of interest in a marine seismic survey, the other notch does occur within a range that is not close to the vertical, but less than the take-off angle of interest.

Figure 6A:
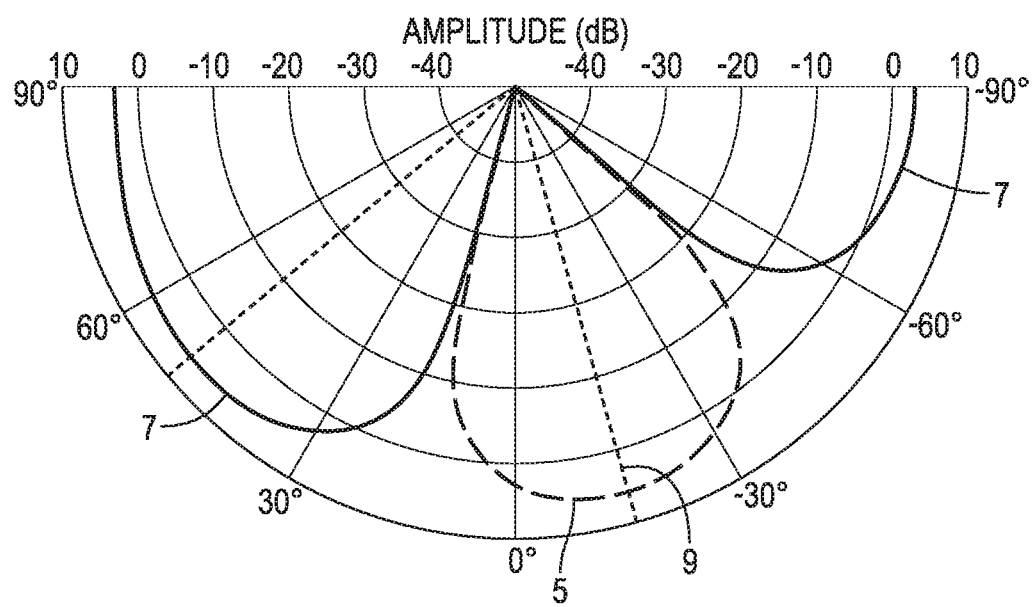
FIGS. 6A and 6B illustrate radiation patterns with multiple notches and peaks as a function of take-off angle for a pair of vibrators within an array that is out of phase by −90 degrees in FIG. 6A and a pair of vibrators within an array that is out of phase by +90 degrees in FIG. 7B.
Figure 6B:
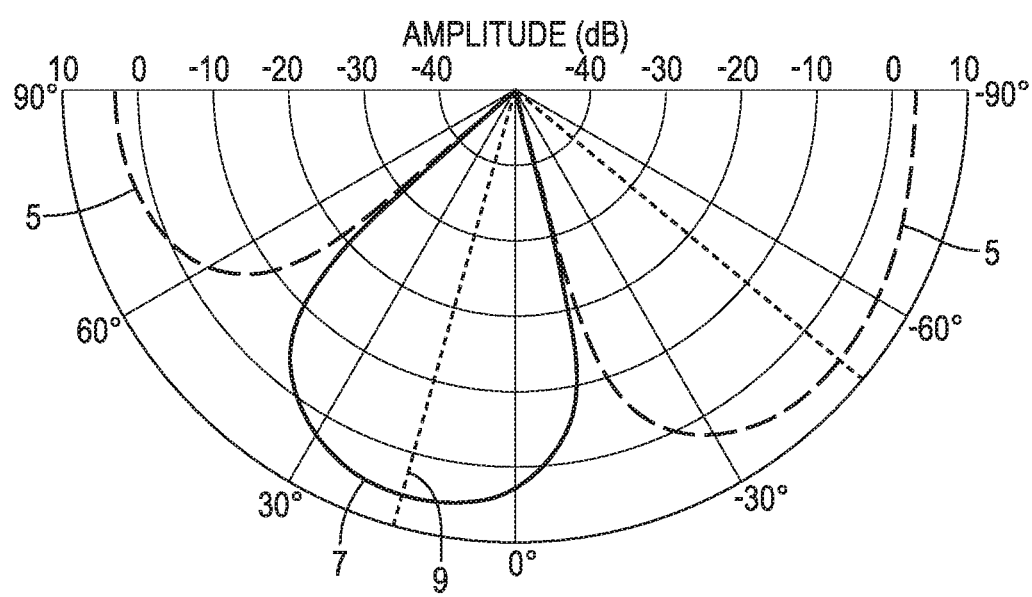

It is also possible to generate output wavefields with multiple notches and peaks. For example, FIGS. 6A and 6B shows the crossline amplitude response for the case where the separation of the two elements is now 30 m (L1 in FIG. 1), and one source pair are 90 degrees out of phase (FIG. 6A) the other are −90 degrees out of phase (FIG. 6B). This configuration has a separation equal to the longest wavelength. As such, this configuration would not be suitable to generate certain gradient wavefields. However, it is suitable to generate a pair of complimentary directive wavefields as disclosed herein. These responses are more complex than those in the previous figures, but they still exhibit similar characteristics, each has peaks where others have notches, and there is a change from positive to negative polarity at those notches.

Figure 7C:
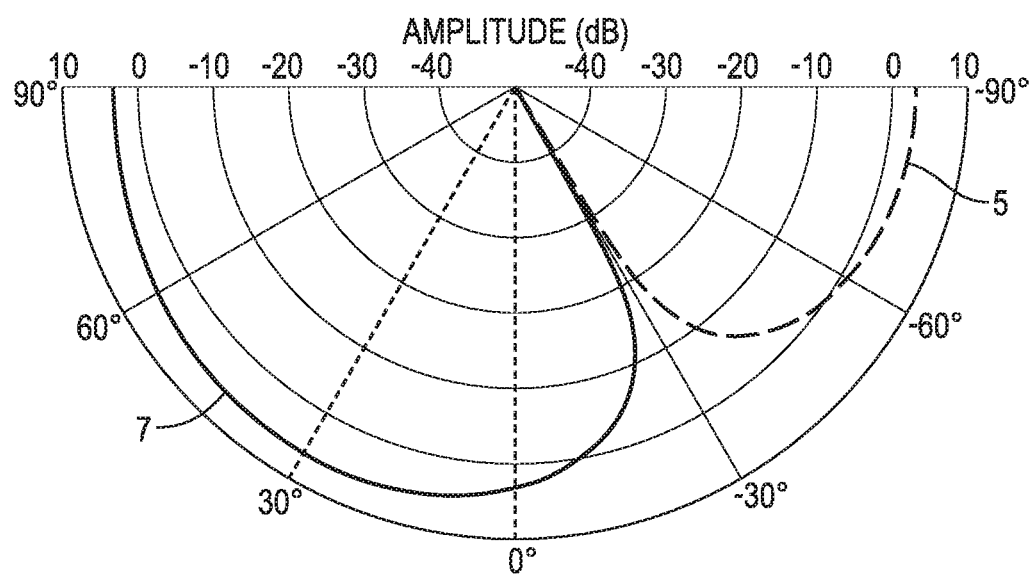
Figure 7D:
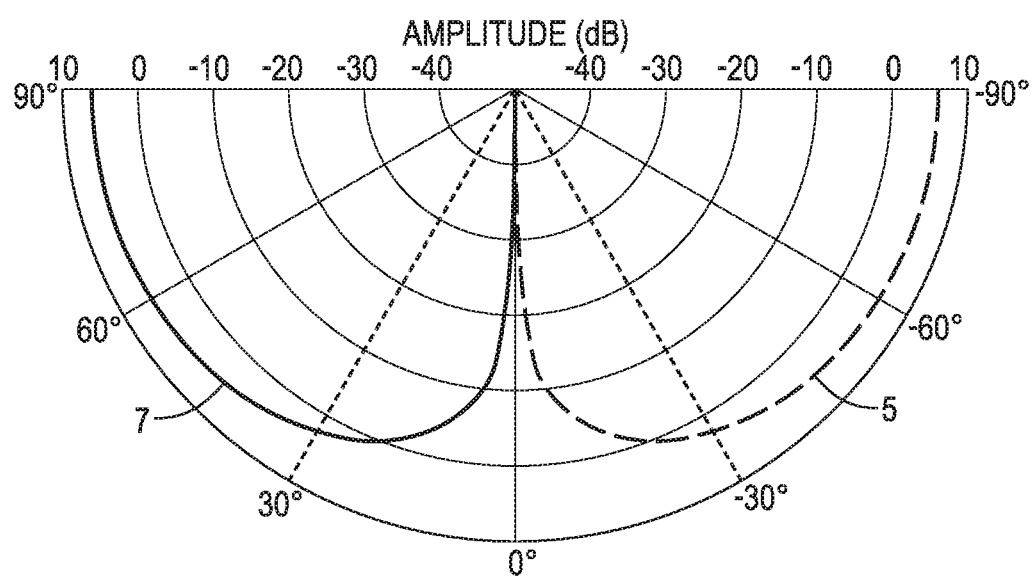

The examples above consider a pair of sources, with two complimentary directivity patterns. FIGS. 7A to 7D illustrate examples where the array of sources consists of more than two marine vibrators, and we can also devise examples where there are more than two complimentary patterns. The figures illustrated an example where the same pair of sources are designed to produce a repeating pattern of four sources. In this particular case, the source pair are out of phase by negative (−)90 degrees (FIG. 7A), 0 degrees (FIG. 7B), 90 degrees (FIG. 7C) and 180 degrees (FIG. 7D). This particular pattern contains an omnidirectional source (0 degrees phase difference) and a source gradient (180 degrees phase difference). The notches are at −30 degrees, 0 degrees, and 30 degrees take-off angle. The distinction between this set of four sources, and an omnidirectional plus gradient configuration is that this set of four complimentary patterns contains at least one source radiation pattern that has a notch at a take-off angle that is not close to the vertical, and less than a defined maximum take-off angle of interest.

The radiation patterns above are idealized versions. In practice it may also be necessary to consider the effect of the sea-surface reflection on these responses. The impact of this will be to introduce a further notch close to maximum/ minimum take-off angles. These notches will be present for all configurations, and thus it is not possible to fill these notches with information from a complimentary directivity pattern. It should also be noted that the idealized patterns will represent target outputs which may not be precisely reproduced in practice due to experimental perturbations. The phase differences between elements in the array may also change as a function of frequency, as the location of the notche(s) is(are) a function of the phase difference, the separation of the elements, and the output frequency. The above describes radiation patterns in the crossline direction. It should be understood that source arrays can be configured to emit directionality patterns that can vary in any direction, and also in multiple dimensions.

Figure 8:
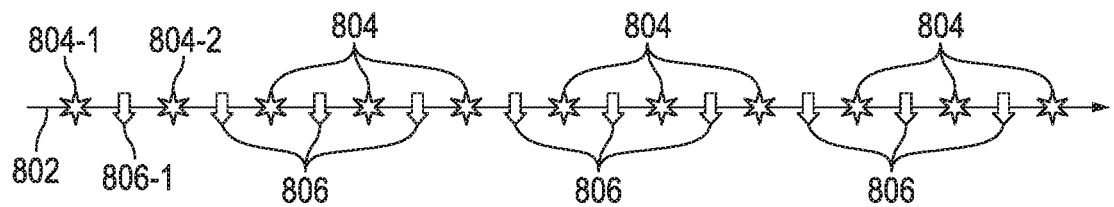
FIG. 8 illustrates an example activation pattern of a seismic vibrator array according to an aspect of the disclosure.

FIG. 8 shows an example shot pattern that can be produced using the seismic vibrator array 104 (FIG. 1) as towed by the marine vessel 102, according to some examples. The tow path of the marine vessel 102 is indicated by 802 (i.e., shot line). As shown in FIG. 8, stars 804 and arrows 806 represent respective shots (i.e., shot points) of the seismic vibrator array 104. A star 804 represents a respective activation of the seismic vibrator array 104 that produces an omnidirectional source wavefield. An arrow 806 represents an activation of the seismic vibrator array 104 that produces a source gradient wavefield. In FIG. 8, the first two stars along the path 802 are referred to as 804-1 and 804-2, respectively, and the first arrow along path 802 is referred to as 806-1. A general reference to stars 804 includes a reference to 804-1 and 804-2, and a general reference to arrows 806 includes a reference to 806-1.

In the example of FIG. 8, an alternating pattern of omnidirectional source activations and source gradient activations is depicted, where successive shots alternate between an omnidirectional source activation (activation of the seismic vibrator array 104 that produces an omnidirectional source wavefield) and a source gradient activation (activation of the seismic vibrator array 104 that produces a source gradient wavefield).

In accordance with further implementations, the phase of the seismic vibrator array 104 can be controlled from shot-to-shot such that a residual shot noise (RSN) from one shot can be mitigated in the next shot. For a given shot, residual shot noise can result from a previous shot or from previous shots. If a shot pattern of the seismic vibrator array 104 is an alternating pattern that alternates between omnidirectional source activations and source gradient activations in successive shots, then residual shot noise from the omnidirectional shot activation can have a relatively strong effect on a subsequent source gradient activation.

By controlling the phase of the successive shots to reduce residual shot noise, the shot interval (the distance or time) between the successive shots can be reduced to increase in-line sampling using the omnidirectional source activations and source gradient activations, without compromising survey data quality. In-line sampling refers to acquiring survey data in response to respective shots of the seismic vibrator array 104. Increasing in-line sampling refers to acquiring a greater amount of survey data, since a larger number of shots are provided.

Increasing in-line sampling can improve results of acquiring survey data. For example, increasing in-line sampling can improve results of performing crossline wavefield reconstruction using survey data acquired in response to source gradient wavefields. Cross-line wavefield reconstruction is discussed further below.

In some examples, residual noise removal or reduction can be accomplished by varying the phase of the omnidirectional source activation by 180° from omnidirectional source to omnidirectional source, while keeping the phase of the gradient source constant. For example, in FIG. 8, the phase of the omnidirectional source (represented by star 804-1) can be set at +90°, while the phase of the next successive omnidirectional source (represented by star 804-2) can be set at −90°. Thus, the phases of successive omnidirectional sources are varied. The omnidirectional source 804-1 and omnidirectional source 804-2 thus have a phase difference of 180° from one another. The phases used for the source gradient sources (represented by arrows 806) do not have to be modified. Other combinations of phases can be used to achieve residual shot noise reduction.

In further implementations, control of the seismic vibrators of the seismic vibrator array 104 can also be split based on frequency, for example, such that the separation between the seismic vibrators is optimized to produce a gradient for different bandwidths. In some cases, the seismic source array 104 is controlled to produce just higher-frequency source gradients. In other words, the seismic vibrators of the seismic source array 104 that are configured to generate higher frequency wavefields are controlled to produce source gradient wavefields for at least certain shots. At lower frequencies, however, the respective seismic vibrators of the seismic vibrator array 104 are controlled to be swept in-phase, and thus would produce just omnidirectional source wavefields, and not source gradient wavefields.

For example, in the arrangement of FIG. 2, the seismic vibrators 106-1 and 106-2 (that produce wavefields at higher frequencies) can be controlled to alternate between in-phase and anti-phase, such that omnidirectional source wavefields and source gradient wavefields are alternately produced from shot-to-shot. However, the seismic vibrators 106-3 (that produce wavefields at a lower frequency) are controlled to be in-phase (so that the seismic vibrators 106-3 do not produce source gradient wavefields).

As noted above, survey data acquired in response to source gradient wavefields (such survey data is referred to as "source gradient data") can be used to perform crossline reconstruction of sources. Reconstruction of a source refers to estimating a source based on actual sources.

Figure 9:
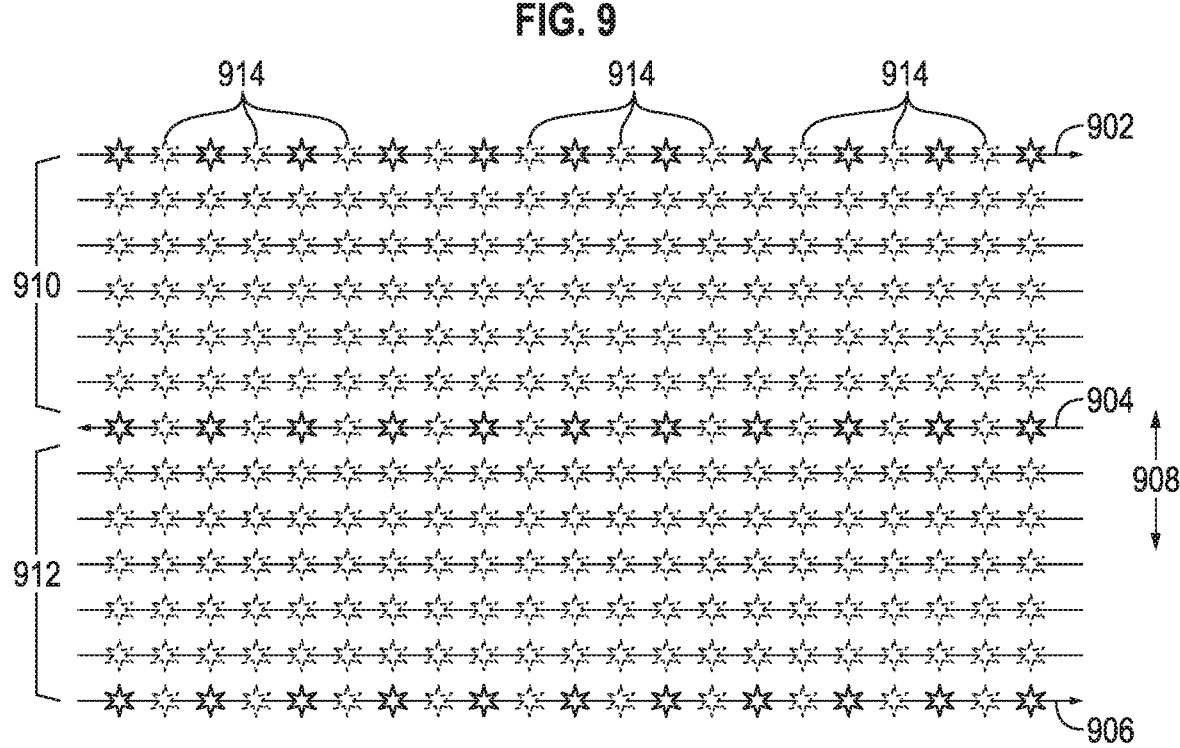
FIG. 9 is a schematic diagram of an example of reconstructing sources according to aspects of the disclosure.

FIG. 9 illustrates a shot pattern produced by the seismic vibrator array 104 traversing along shot lines paths 902, 904, and 906. In FIG. 9, the darker stars represent actual shot points, while the lighter (dashed or dotted) stars represent reconstructed shot points. A direction of the arrow 902, 904, or 906 is the in-line direction (or direction of travel of the seismic vibrator array 104). The crossline direction is the direction represented by dual arrow 908, which is generally perpendicular to the in-line direction. Crossline reconstruction refers to reconstruction of sources (shot data) between actual sources in the crossline direction 908. Crossline reconstruction can be accomplished by performing interpolation between the actual sources. In FIG. 9, the reconstructed shot data provided by the crossline reconstruction include reconstructed sources 910 and 912. The reconstructed sources 910 are between paths 902 and 904, while the reconstructed sources 912 are between paths 904 and 906.

In the use of source gradient data (survey data acquired in response to a source gradient wavefield) for crossline reconstruction, the use of a dedicated low-frequency seismic vibrator(s) can obviate having to employ a low-frequency source gradient wavefield, as crossline reconstruction may not have to be performed at low frequencies. This has the added benefit of increasing low-frequency output, since the source gradient wavefield may result in reduced output energy. Varying the frequency outputs of different seismic vibrators can also allow the seismic vibrators to repeat sweeps at different time intervals, to allow in-line sampling to be varied for different frequencies. In some cases, this may allow for an omnidirectional source wavefield and source gradient wavefield to be acquired without aliasing.

In accordance with some implementations, crossline reconstruction can include beyond Nyquist source side reconstruction. An example of beyond Nyquist source side reconstruction is described in Massimiliano Vassallo et al., "Crossline Wavefield Reconstruction for Multi-Components Streamer Data: Part 1—Multi-Channel Interpolation by Matching Pursuit (MIMAP) Using Pressure and Its Crossline Gradient," SOCIETY OF EXPLORATION GEOPHYSICISTS (2010), which is incorporated by reference. Whereas the method of Vassallo et al. performs reconstruction of the receiver side wavefield, it is noted that methods that use measurements of pressure and its crossline gradient can be adapted for application on the source-side (e.g. for source wavefield reconstruction), as the source wavefield and corresponding gradient wavefield have similar properties to the pressure wavefield and its gradient.

In addition to performing crossline reconstruction, FIG. 9 also depicts in-line reconstruction to reconstruct omnidirectional sources between actual omnidirectional sources in an in-line direction. For example, along path 902, omnidirectional sources represented by lighter stars 914 are reconstructed omnidirectional sources provided by in-line reconstruction.

In a seismic ocean bottom survey arrangement as illustrated in FIG. 1, survey receiver locations can be fixed. In a traditional water bottom survey, a marine vessel towing a seismic source would repeat source lines at close spacings. However, if source gradients are available using techniques or mechanisms according to some implementations, the source line spacing (spacing between arrows 902, 904, 906 in FIG. 9, for example), can be increased, such that survey time can be reduced (since fewer shots have to be performed). In the common-receiver domain, the combination of the alternating omnidirectional-gradient source array with a multi-component beyond-Nyquist reconstruction technique can allow a smaller crossline sampling to be recovered from the wider crossline sampling depicted in FIG. 9.

To further increase survey efficiency, one alternating omnidirectional-gradient source array 104 may be used simultaneously with another alternating omnidirectional-gradient source array 104. For example, the sources may use a simultaneous source technique based on time or phase dithering, phase sequencing, or a frequency-sparse technique. An example of time dithering is described in Moore et al., "Simultaneous Source Separation Using Dithered Sources," SEG Las Vegas 2008 Annual Meeting, which is hereby incorporated by reference. An example of phase sequencing is described in U.S. Patent Publication No. US 2014/0278119, which claims priority to Provisional Application No. 61/788,265, entitled "Simultaneous Seismic Sources," filed Mar. 15, 2014, which are both hereby incorporated by reference. An example of a frequency-sparse technique is described in U.S. Publication No. 2014/0278116, which claims priority to Provisional Application No. 61/1787,643, entitled "Frequency-Sparse Sources," filed Mar. 15, 2013, which are both hereby incorporated by reference.

By controlling the directionality of the source array it is possible to acquire seismic data that can be used to de-alias the seismic sources using beyond Nyquist reconstruction techniques. By controlling the phase of multiple seismic source arrays is it possible to acquire simultaneous source data that can be more easily separated, for example, where sequences of phases are used to move the energy from one shot into the empty part of the frequency-wavenumber space of another shot.

By using the phase control method, data acquired from simultaneous sources can be made to appear almost identical to aliased data acquired from a single source, by observing the two datasets in the frequency-wavenumber domain. A synthetic data example of this is illustrated in FIGS. 10A and 10B.

Figure 10A:
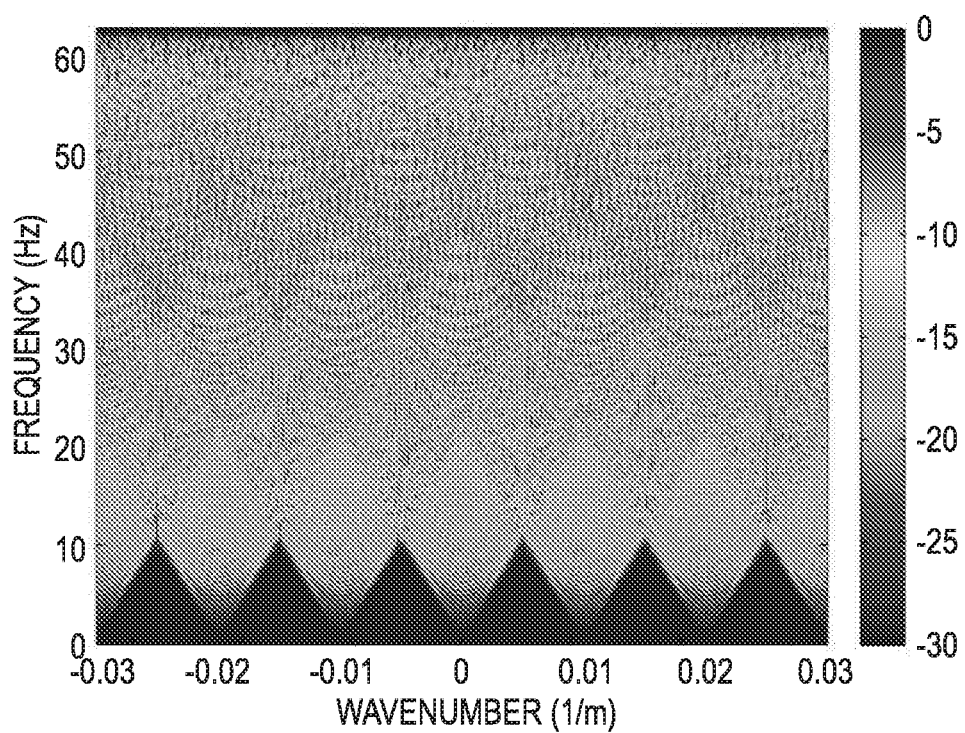
FIGS. 10A and 10B illustrate frequency-wavenumber spectra for a single source line sampled at 90 m (FIG. 10A) and for six simultaneous source lines sampled at 15 m (FIG. 10B).

FIG. 10A is a plot showing data from a single line of sources sampled at 90 m. The Nyquist sampling of this data is 15 m, thus in the frequency wavenumber domain there are six copies of the data. There is one true version of the data (centered on 0 Wavenumber) and 5 aliased replicas of the data (centered at −0.033, −0.022, −0.011, 0.011, and 0.022 l/m wavenumber).

Figure 10B:
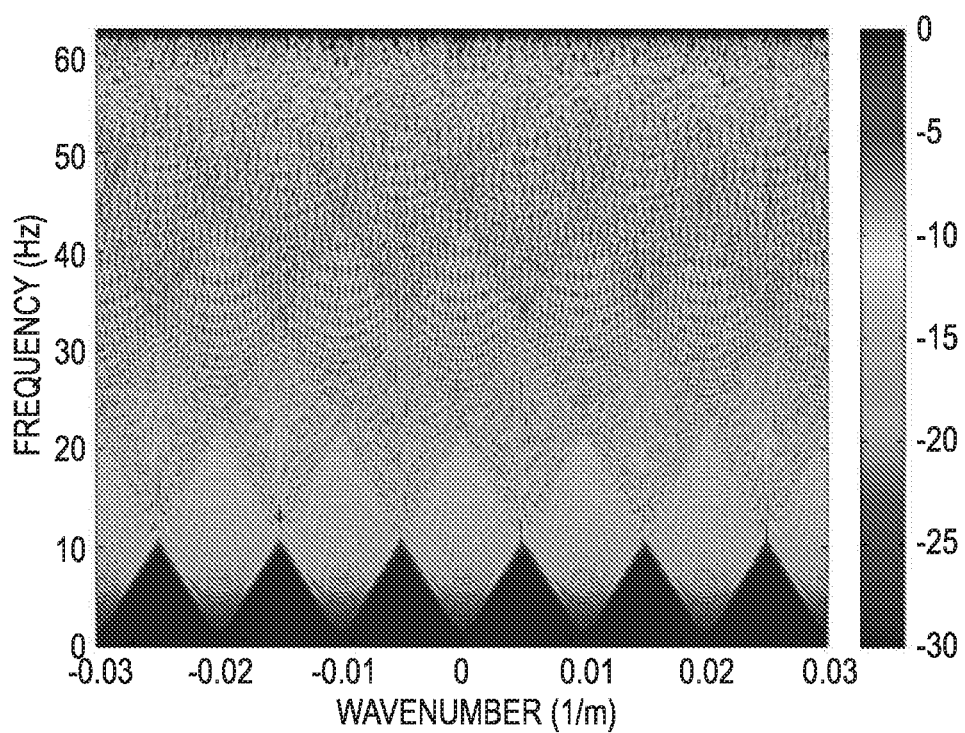

FIG. 10B is a plot showing data from six adjacent lines of sources, with each line being sampled at 15 m. The phase for each source along the first line remains constant from shot-to-shot, along the second line it varies by 60 degrees from shot-to-shot, along the third line by 120 degrees, along the fourth line 180 degrees, the fifth line 240 degrees, and the sixth line 300 degrees. This has the effect of shifting the origin of the signal cones in frequency-wavenumber space by 0, 0.011, 0.022, 0.033, 0.044, and 0.055 l/m, respectively. Since the wavenumber axis is cyclical, this is equivalent to shifts of 0, 0.011, 0.022, −0.033, −0.022, and −0.011. These shifts are the same as the positions at which the six copies of the data occur in the aliased data in the FIG. 10A plot. Thus, the FIG. 10B plot representing the six simultaneous sources, appears very similar to the FIG. 10A plot, which contains only one source.

Figure 11A:
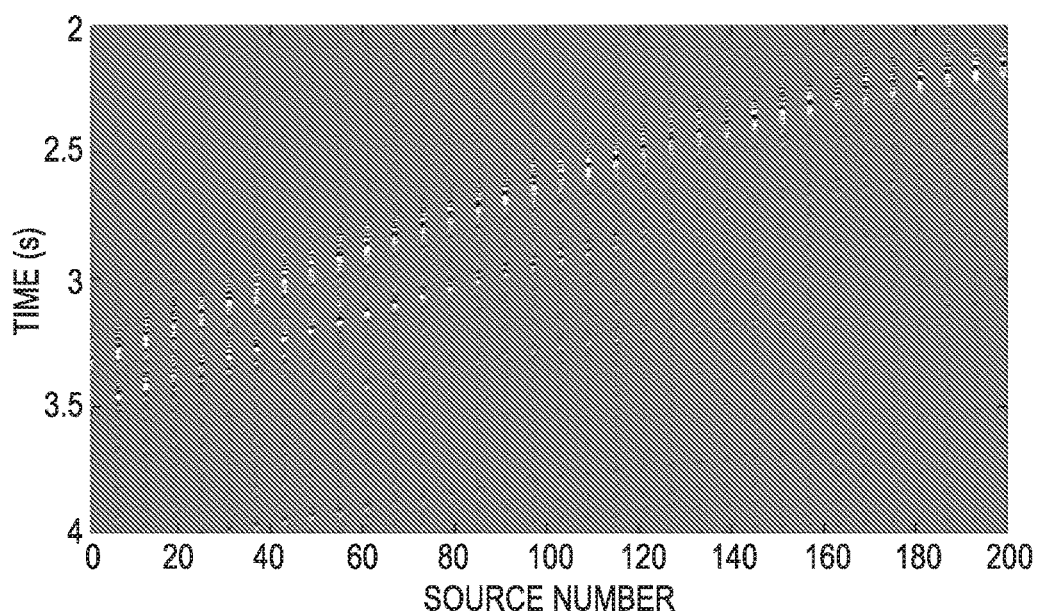
FIG. 11A illustrates in a time domain a portion of the data used to compute the frequency-wavenumber spectra for a single source line in FIG. 10A.
Figure 11B:
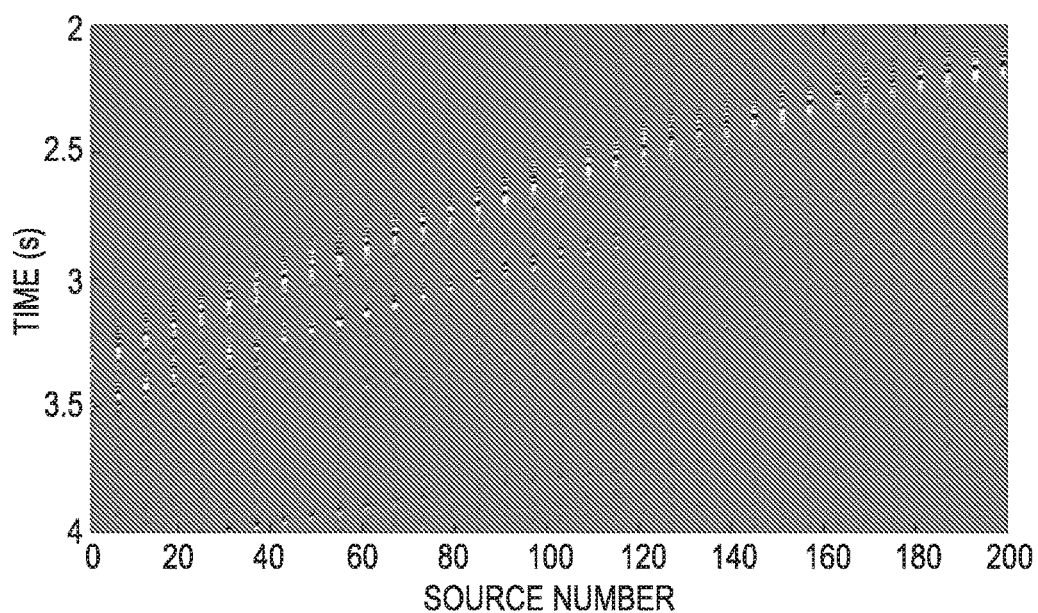
FIG. 11B illustrates in a time domain a portion of the data used to compute the frequency-wavenumber spectra for six simultaneous source lines in FIG. 10B.

The differences are much clearer in the time-offset domain. A portion of the data used to generate the frequency-wavenumber plots are shown in FIGS. 11A and 11B. These are plotted with a trace spacing of 15 m, so the FIG. 11A plot showing the aliased data (FIG. 10A) has every 5 out of 6 traces empty, whereas the simultaneous source data (FIG. 10B) plotted in FIG. 11B has data on every trace (in fact, each trace contains the data from 6 sources).

Problems such as those in FIGS. 10A and 10B can be solved using any number of anti-aliasing methods. In particular, they can be solved by using beyond Nyquist reconstruction methods. This is done by introducing different types of complimentary data. For seismic sources, these types of complimentary data may be due to source arrays emitting omnidirectional and source gradient wavefields, or sources emitting wavefields with other types of directivity pattern. Thus, by using directive sources it is possible to solve aliasing problems like that shown in FIG. 10A. Such problems are much more difficult to solve using a seismic source that emits only a single directivity pattern, for example, the conventional tuned air gun array.

Likewise, if the simultaneous source data in FIG. 10B had been acquired with a single directivity pattern, then there is not enough information for the wavefields to be separated. However, since directive sources can be used to solve the beyond-Nyquist aliasing problem represented by FIG. 10A, this means that such directive sources can also solve the simultaneous source problem in FIG. 10B.

Thus, the various combinations of embodied features herein relate to the acquisition of simultaneous source seismic data using directive sources and phase control from shot-to-shot to enable a new type of simultaneous source separation. This is done by acquiring the data using source arrays emitting specific directivity patterns, and with the phase for each simultaneous source changing from shot-to-shot in a prescribed way.

Using an array of marine vibrators, the directivity of the output wavefield can be controlled by varying the relative phase of the vibrators within the array, and also by varying the distance between the vibrator elements within the array. For the advanced processing methods required the directivity patterns must be chosen such that they are complimentary to one another.

The choice of phase pattern is more complicated, as a number of factors needs to be taken into account, including the number of simultaneous sources, how those sources are sampled along each source line, and how the sources emitting different directionality patterns are distributed. In the example in FIGS. 10A and 10B, there were six sources that were each sampled within the Nyquist sampling criteria. The required phase pattern then involves defining six regularly sampled points along the wavenumber axis (from minus Nyquist wavenumber to positive Nyquist wavenumber) and defining the phase shift required from shot-to-shot in order to place the origin of each shot at one of those six regularly sampled points. In this case, the following patterns of repeating phase shifts are required: Source 1: 0, 0, 0, 0, 0, 0 degrees; Source 2: 0, 60, 120, 180, 240, 300 degrees; Source 3: 0, 120, 240, 0, 120, 240 degrees; Source 4: 0, 180, 0, 180, 0, 180 degrees; Source 5: 0, 240, 120, 0, 240, 120 degrees; and Source 6: 0, 300, 240, 180, 120, 60 degrees.

However, it may be the case that the shots along each line are not sampled within the Nyquist criteria. If instead those shots are aliased, and sampled at an interval of 30 m, there will then be one true version of the data in frequency-wavenumber space, and one aliased replica. The aliased replica will be centered on the Nyquist wavenumber. Thus, to give a problem of the same complexity, only another 2 simultaneous sources can be introduced. The following patterns of repeating phase shifts can be used in this case: Source 1: 0, 0, 0 degrees; Source 2: 0, 120, 240 degrees; and Source 3: 0, 240, 120 degrees.

Effectively, this is a trade-off between the requirements on source sampling, and the number of simultaneous sources that can be used. Of course, the same number of sources could be used with the increased sampling, and this would just make the problem more complex (and would require a different set of repeating phase shifts). Note, that because the same type of directive sources can be used for source separation that can be used for beyond Nyquist reconstruction, the type of data acquired using this method can be used for both simultaneous source separation and wavefield reconstruction.

The fact that the sources may emit different directionality patterns have not been accounted for in the sequences above. In the case where each source emits only a single directionality pattern, then the sequences of phases above can be applied directly. One beneficial way to use directionality patterns may be to have the same source emitting different directionality patterns along each source line. For example, a single source array alternates between emitting the omnidirectional radiation pattern, and the source gradient radiation pattern. In this case, it may be possible to use a single sequence of phases along the line, but it may also be desirable to treat each radiation pattern as a different source. One particular benefit of this, is that it can separate the residual shot noise from one shot to the next, allowing for shorter listening times to be used.

Considering the six source case above, if there were two alternating directivity patterns, then Source 1 and Source 4 would correspond to the alternating directivity patterns emitted along the first source line, Source 2 and 5 to the patterns emitted along the second source line, and Source 3 and 6 to the patterns emitted along the third source line. By acquiring the data in this way, the residual shot noise (the energy remaining from the previous shot) can be separated from the data for the current shot. Note the pairs were chosen such that the difference between the sequences alternates between 0 and 180 degrees in this example.

FIG. 12 illustrates a geometry used to demonstrate the separation of simultaneous source data acquired according to aspects of this disclosure. The synthetic data are generated using a modified version of the SEAM model (SEg Advanced Modelling). The triangles 114 in FIG. 12 indicate receiver positions, these may represent hydrophones and/or accelerometers on a seismic streamer cable, or they may represent receivers deployed on the sea bed. The two lines of stars and arrows indicate two source lines 11, 13 that are acquired simultaneously. The star 15 indicates a source with an omnidirectional radiation pattern (similar to that shown in FIG. 3A) and the arrow 17 indicates a source with a gradient directivity pattern (similar to that shown in FIG. 3B). Data for each of these source lines is generated and is summed together to represent data that might have been acquired in a simultaneous source experiment.

The sampling between each omnidirectional source (star 15) is 60 m, and the sampling between each gradient source (arrow 17) is also 60 m. For this dataset, the Nyquist sampling is 15 m. Thus each source type is aliased by a factor of four, meaning that in the corresponding frequency-wavenumber plot there will be one true copy of the data and three aliased replicas.

In accordance to one or more embodiments, the simultaneous source data can be acquired using phase-shifts from shot-to-shot along each source line that places the simultaneous source data between the aliased replicas introduced by the spatial sampling along that line. In this case, the following sequences can be used: Sequence 1 (Source 1, directivity pattern 1): 0, 0, 0, 0 degrees; Sequence 2 (Source 2, directivity pattern 1): 0, 90, 180, 270 degrees; Sequence 3 (Source 1, directivity pattern 2): 0, 180, 0, 180 degrees; and Sequence 4 (Source 2, directivity pattern 2): 0, 270, 540, 810 degrees.

These example phase shifts could have been determined by dividing 360 by the number of required sequences, and multiplying the result by the sequence number minus 1, i.e., $$\varphi s = (s-1) \times \frac{360}{n} \quad (3)$$

where ψs is the required phase shift from shot-to-shot for sequence s, and n is the number of sequences required. Other sequences may be used that are defined by similar expressions.

Figure 13A:
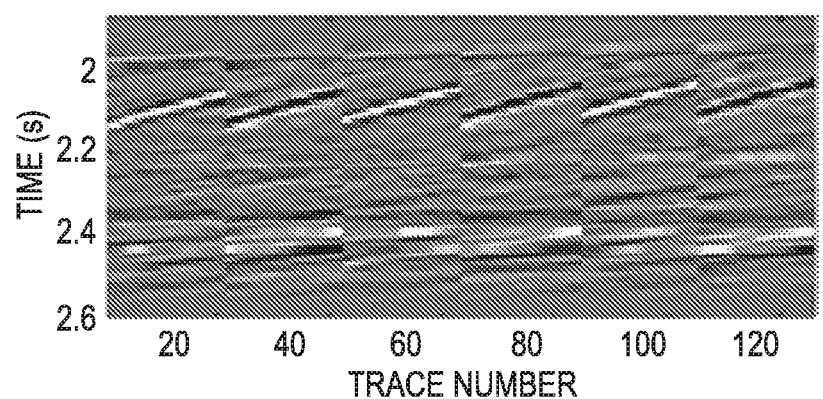
FIGS. 13A and 13B illustrate, with reference to FIG. 12, the simultaneous source lines measured along the line of receivers aligned to the phase of source 1 with directivity pattern 1, and source 2 with directivity pattern 1, respectively.
Figure 13B:
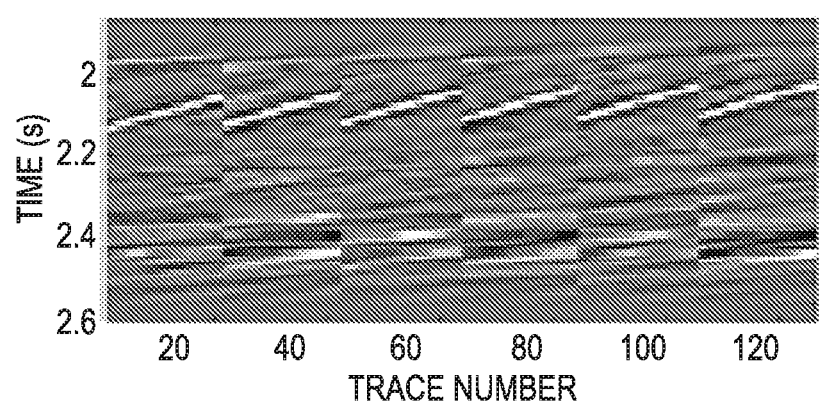
Figure 13C:
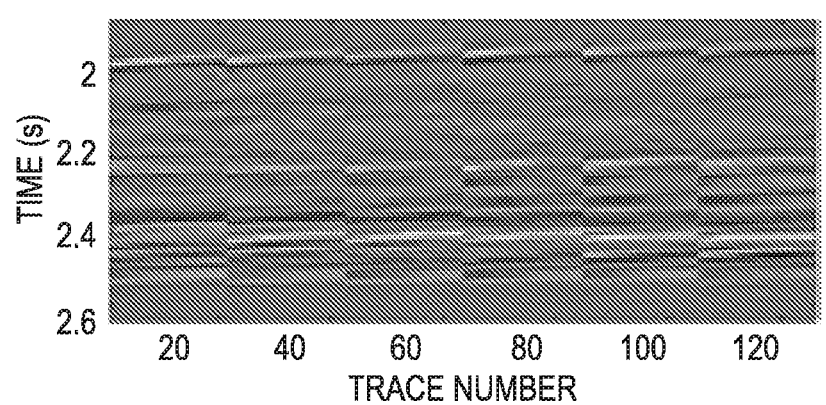
FIGS. 13C and 13D illustrate, with reference to FIG. 12, the desired non-simultaneous data for sources 1 and 2, respectively.
Figure 13D:
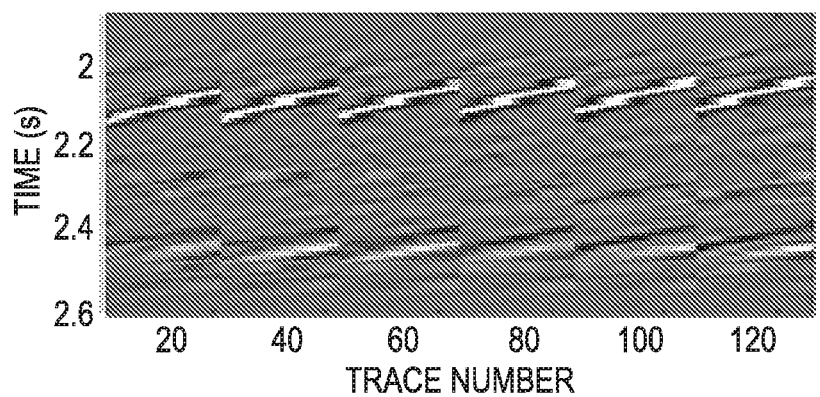
Figure 13E:
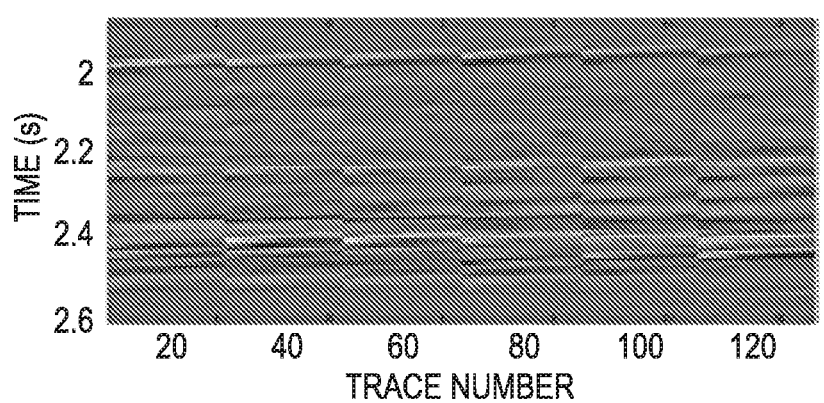
FIGS. 13E and 13F illustrate, with reference to FIG. 12, the results of using a simultaneous source version of the extended-Generalized Matching Pursuit (E-GMP) algorithm.
Figure 13F:
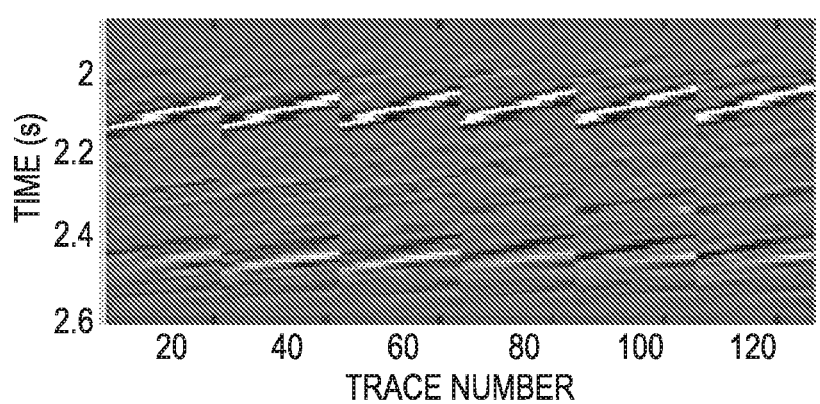
Figure 13G:
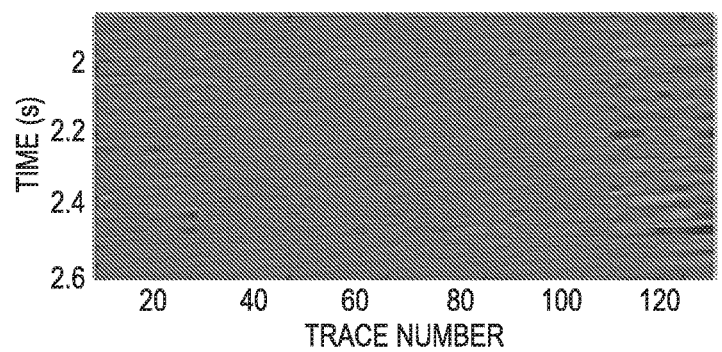
FIGS. 13G and 13H illustrate the difference between the desired non-simultaneous data and the separated data (with the gain increased by a factor of 2).
Figure 13H:
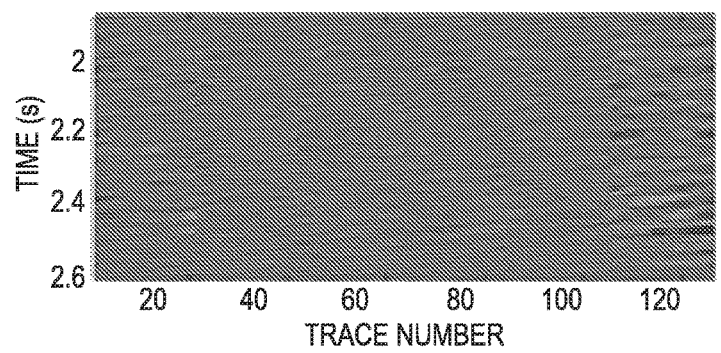

An example of the data generated from this geometry (see, FIG. 12) is shown in FIGS. 13A-13H, wherein each panel shows the data corresponding to 21 receivers for each of the six sources. FIGS. 13A and 13B show the data in turn, for the simultaneous source lines measured along the line of receivers aligned to the phase of source 1 with directivity pattern 1, and source 2 with directivity pattern 1, respectively. FIGS. 13C and 13D show the desired non-simultaneous data for sources 1 and 2, respectively, and FIGS. 13E and 13F show the results of using a simultaneous source version of the extended-Generalized Matching Pursuit (E-GMP) algorithm. Extended generalized matching pursuit is described for example in published patent application No. WO 2015/168130 the teachings of which are incorporated herein by reference. FIGS. 13G and 13H show the difference between the desired non-simultaneous data and the separated data (with the gain increased by a factor of 2). It is clear that by using the acquisition scheme described in this disclosure that the simultaneous source data can be separated with a high level of accuracy.

The above describes the combinations of directive sources with phase sequencing to enable simultaneous source separation. An alternative, that is also novel, could be to use a combination of directive sources with other phase based simultaneous source encoding methods, for example, it may be desirable to use pseudo-random phase (or time delays), or to allow a small amount of pseudo-random variation to the sequence of phases from shot-to-shot. As well as using phase based encoding, a spatial encoding scheme such as pseudo-random spatial sampling may also be combined with directive sources.

Various mathematical methods of interpolation and reconstruction can be used with respect to source signals and receiver signals. Various embodiments of vibrators can be used. According to various embodiments, a method where the vibrator physically produces a known and controllable source signal gradient that is in turn used at the receiver to account for a source signal gradient and to apply reconstruction to produce seismic images with a finer spatial sampling is disclosed, and is functionally equivalent to having physically produced source signals from different locations than was actually used. Through reconstruction, resulting data is generated is as if there were sources from source locations where no source was actually present.

Figure 14A:
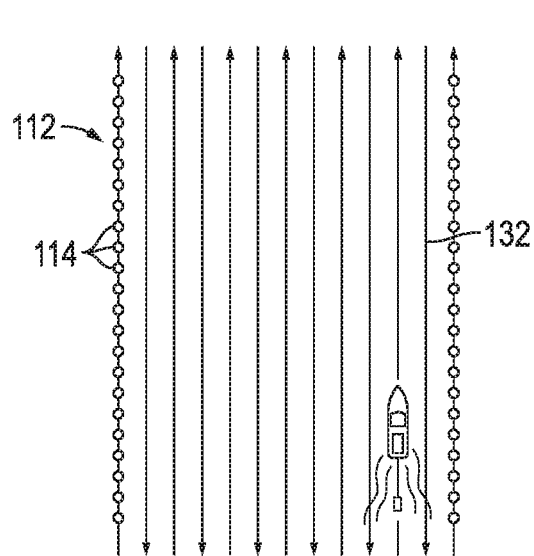
FIGS. 14A and 14B are schematic illustrations of marine seismic surveys illustrating increased efficiencies in accordance to aspects of this disclosure.
Figure 14B:
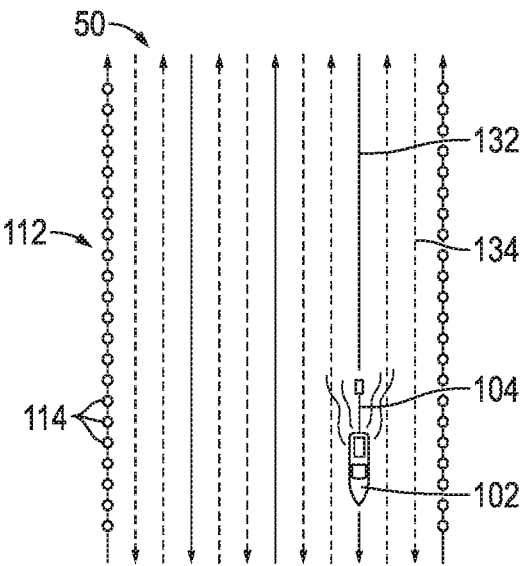

Utilizing aspects disclosed herein marine seismic surveys can be planned and implemented to improve efficiencies while obtaining quality data as described for example with reference to FIGS. 14A and 14B. In view of the improved efficiencies, quality data may be acquired utilizing seismic ocean bottom surveys as opposed to towed receivers. FIG. 14A illustrates a seismic survey utilizing omnidirectional source technology where the source vessel 102 travels along predefined paths 132 (in this case in a back/forth pattern), for example with 30 m spacing between sail lines (shot lines), while activating the source in a predefined manner. On the outer portion of the illustrated vessel path are a series 112 of seismic receivers 114 that are located on the seafloor. In FIG. 14A there are 13 source lines 132 that provide the source input for the survey, and the survey can take thirty-six hours as a result.

FIG. 14B illustrates a seismic ocean bottom survey 50 in accordance to one or more aspects. The vibrator array 104 can be driven so as to know the source gradients or adequate approximations thereof so that fewer source (shot lines) 132 can be used relative to the survey in FIG. 14A, by reconstructing shot lines 134 (dashed lines). As opposed to FIG. 14A the actual source or shot lines 132 are spaced about 90 meters apart. According to various combinations of embodied features herein with respect to the directed source (source gradients) that are provided by using at least two vibrators as detailed herein activating in anti-phase to produce source gradients, when detected by an omnidirectional receiver 114 such allows for reconstruction of shot point data as if from points where no actual shot point was present or occurred, this results in an improvement in efficiency. FIGS. 14A and 14B illustrate improvements in the marine ocean bottom survey that formerly took thirty-six hours and thirteen source lines 132 in FIG. 14A took only five shot lines 132 and about twelve hours in FIG. 14B with reconstructed shot lines 134 to produce usable data.

With respect to the time and cost comparison of the surveys in FIGS. 14A and 14B, it can be estimated that the operational cost of the survey 50 (FIG. 14B) using source gradient technology can be in the magnitude of one half that of a survey that does not use source gradient technology. It is also possible to achieve a situation where the survey using the source gradient technology is at least one third the cost of a survey that does not use the source gradient technology.

According to various embodiments, a survey can be planned using and being based on directional vibratory sources (dipole sources) producing source gradients, in a number of ways. One way is to first establish the survey area and the resolution (e.g. actual shots versus reconstructed shots) for the survey data. Once the resolution is determined, the desired source lines and/or shot points (actual or reconstructed) can be determined. The frequency(s) can also be determined. Once the desired source lines, shot points and/or frequencies are determined, with respect to the source gradient vibrator, it is then determined which source points (or source lines or combinations thereof) will actually be performed, and which will reconstructed.

Another way of survey design includes determining the survey area and the resolution at which the survey data will occur. Once the resolution is determined, and based on the understanding and attributes of the marine vibrator source gradient technology, the shot lines/points that are needed for use of the marine vibrator source gradient in order to provide a source that can provide the desired resolution of survey data can be determined.

Once the actual shooting path of the source vessel is known, the cost and time of the survey can be determined based at least in part on the speed and tack of the vessel and the time the survey will take, as well as other accountable costs such as fuel, man hours etc. Based on at least some of those variables, a price estimate for a survey using the source gradient technology can be determined.

By way of the source gradient technology it is possible to determine an improvement in efficiency between a survey performed with a monopole source vibrator and a source gradient source vibrator. This can be done by determining the costs associated with a survey that will meet each shot line/point that would be needed with a monopole source, and compare such with that required with a source gradient source vibrator, as shown e.g. in FIGS. 14A and 14B. This can be done by a computing device that has a human input device and a data display device.

Software programs can be used for survey planning with source gradient vibrator surveys. The computer programs can take into account various aspects of the survey such as survey area, water depth, desired image/data output, desired resolution, source power, depth of survey into the earth formation, type of earth formation, vessel speed, vessel cost, and other factors.

It is possible for a survey to be designed to fit a certain cost versus quality parameter. It may be the case that a client desires a survey of lesser data accuracy, but that meets a lower cost structure. In that case, the resolution can be lower, and it is possible that the number of reconstructed shot points can be increased at the expense of some data quality. Also, the number of actual shot points can be reduced. Conversely, to the extent a client desires more accuracy and can accept a higher cost, fewer reconstructed shot points can be used and/or more actual shot points can be used. These calculations can be performed by a computer that is programmed to take in various parameters of a survey, and can produce (in a visual manner via a display device) a survey design that will meet those criteria.

A method according to aspects of the disclosure includes selecting a marine vibrator array that is capable of being driven in anti-phase to produce a directional source gradient, determining a resolution for a seismic ocean bottom survey (OBS) and designing the seismic OBS based on the selected marine vibrator array to achieve the determined resolution. The designing may include determining the location of seismic receivers on a seabed, shot line locations and shot point locations. The designing may include determining a timing for the shot points. Methods herein may include locating the seismic receivers on the seabed based on the determined locations, moving the selected marine vibrator array along the determined shot line locations, producing directional source gradient signals at actual shot points based on the determined shot point locations and detecting and recording reverberations from the directional source gradient signals with the seismic receivers. The method may also include reconstructing seismic data based on the detected directional source gradient signals so that survey data is as if shot points exist where the actual shot points did not occur.

A marine seismic survey method according to an aspect of the disclosure includes activating a vibrator array of two or more marine vibrators to emit a plurality of radiation patterns with at least a first radiation pattern that has a first notch at a take-off angle that is not close to vertical, and less than a maximum take-off angle of interest, and at least a second radiation pattern that does not have a notch at a take-off angle close to that first notch. In an example, the first radiation pattern has a take-off angle greater than about 5 degrees and less than 45 degrees, wherein the maximum take-off angle of interest is 45 degrees. The plurality of radiation patterns may be emitted at the same spatial location or at different spatial locations.

A marine seismic survey method includes emitting directive wavefields from two or more simultaneous seismic source arrays, wherein the two or more seismic source arrays have a phase that changes from shot-to-shot to allow simultaneous source separation of the directive wavefields. The directive wavefields may include an omnidirectional wavefield and a source gradient wavefield. The directive wavefields may be complimentary directive wavefields. The two or more simultaneous seismic source arrays may each emit two or more alternating directive wavefields. In accordance to some embodiments the phase changes follow a prescribed non-random sequence and in some embodiments a random sequence. The phase change may be a random time dither. In some embodiments the phase changes follow a random deviation from a prescribed nonrandom sequence. In some embodiments the phase changes by a constant value from shot-to-shot, described by $\psi s=(s-1)*360/n$, where $\psi s$ is the required phase shift from shot-to-shot for sequence s, and n is the number of sequences required. In some embodiment the simultaneous source data is separated for example using one of a frequency sparse technique and an extended generalized matching pursuit technique.

Figure 15:
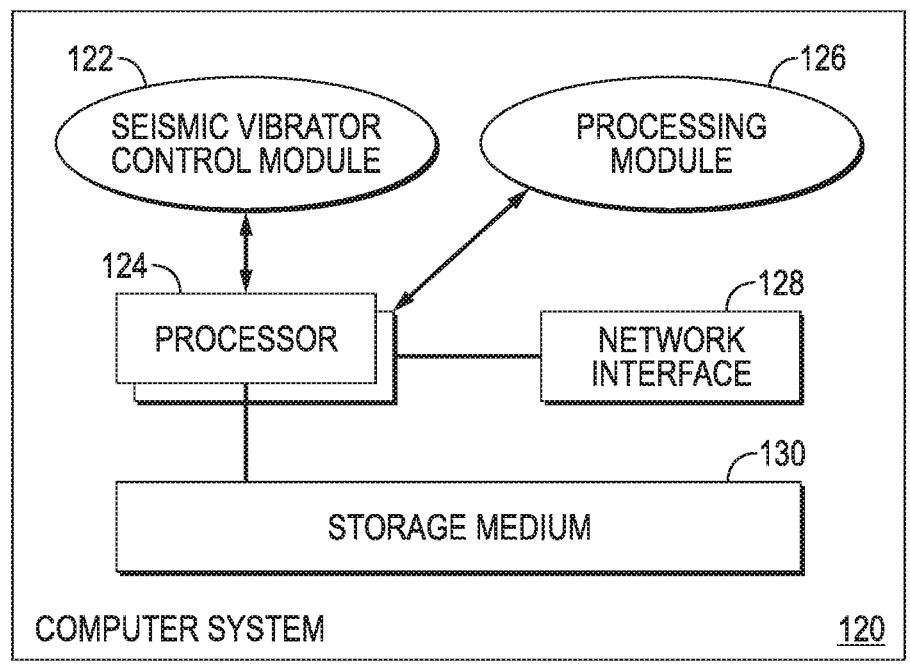
FIG. 15 is a block diagram of a computer system according to some examples.

FIG. 15 is a block diagram of a computer system 120, which can be part of the controller 108 shown in FIG. 1. The computer system 120 includes a seismic vibrator control module 122, which is executable on one or multiple processors 124 to control seismic vibrators of the seismic vibrator array 104. The computer system 120 can also include a processing module 126, which is executable on the processor(s) 124 to perform any of the tasks discussed above, such as crossline reconstruction, in-line reconstruction, up-down source side wavefield reconstruction, and/or multi-component imaging, in some examples. Note that the processing module 126 can be provided in a computer system that is separate from a computer system including the seismic vibrator control module 122. The processor(s) 124 can be coupled to a network interface 128 (to allow the computer system 120 to communicate over a network) and a storage medium (or storage media) 130, to store data and machine-executable instructions.

The storage medium (or storage media) 130 can be implemented as one or more non-transitory computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A marine seismic survey method, comprising:
    at a first time,
        operating a first marine vibrator in a first source array at a first phase; and
        simultaneously operating a second marine vibrator in a first source array at a second phase; wherein a first phase difference between the first phase and the second phase is selected so that its absolute value is more than zero but less than 180 degrees so as to cause the first source array to emit a first directive wavefield; and
        simultaneously operating a third marine vibrator in a second source array at a third phase; and
        simultaneously operating a fourth marine vibrator in a second source array at a fourth phase, wherein a second phase difference between the third phase and the fourth phase is selected so its absolute value is more than zero but less than 180 degrees so as to cause the second source array to emit a second directive wavefield simultaneously with the first directive wavefield; and wherein the second phase difference is not equal to the first phase difference; and
    at a second time
        operating the first marine vibrator in the first source array at a fifth phase; and
        simultaneously operating the second marine vibrator in the first source array at a sixth phase; wherein a third phase difference between the fifth phase and the sixth phase is selected so its absolute value is more than zero but less than 180 degrees so as to cause the first source array to emit a third directive wavefield; and
        simultaneously operating the third marine vibrator in the second source array at a seventh phase; and
        simultaneously operating the fourth marine vibrator in the second source array at an eighth phase, wherein a fourth phase difference between the seventh phase and the eighth phase is selected so its absolute value is more than zero but less than 180 degrees so as to cause the second source array to emit a fourth directive wavefield simultaneously with the third directive wavefield; and wherein none of the first, second, third or fourth phase differences is the same; and
    wherein the first, second, third and fourth phase differences are also selected to facilitate separation of the simultaneous directive wavefields; and
    wherein the simultaneous directive wavefields propagate into a subsurface structure that reflects at least a part of the simultaneous directive wavefields; and
    recording the at least a part of the reflected simultaneous directive wavefield data via a series of seismic sensors deployed in a cable or a nodal form, wherein the simultaneous directive wavefield data is transmitted to a controller for storage or processing.

2. The method of claim 1, wherein any pair of the first second, third and fourth directive wavefields are complimentary directive wavefields.

3. The method of claim 1, wherein the two source arrays are operated at a plurality of successive times to emit additional pairs of simultaneous directive wavefields wherein each additional directive wavefield has a phase difference with an absolute value greater than zero and less than one hundred eighty degrees and wherein no additional pair of simultaneous directive wavefields have the same phase difference and wherein the phase differences of successive pairs of additional simultaneous directive wavefields are selected so as to facilitate separation of the simultaneous directive wavefields.

4. The method of claim 3, wherein selecting the phase differences of successive pairs of additional simultaneous directive wavefields to facilitate separation means selecting the phases so they change after a prescribed non-random sequence.

5. The method of claim 3, wherein selecting the phase differences of successive pairs of additional simultaneous directive wavefields to facilitate separation means selecting the phases so they change after a random sequence.

6. The method of claim 3, wherein selecting the phase differences of successive pairs of additional simultaneous directive wavefields to facilitate separation means selecting the phases so they change based on a random time dither.

7. The method of claim 3, wherein selecting the phase differences of successive pairs of additional simultaneous directive wavefields to facilitate separation means selecting the phases so they change after a random deviation from a prescribed nonrandom sequence.

8. The method of claim 3, wherein over a sequence of n successive pairs of additional simultaneous directive wavefields, selecting the phase differences of successive pairs of additional simultaneous directive wavefields to facilitate separation means selecting the phases so they change by a constant value from time to time, described by $\psi s=(s-1)*360/n$, where $\psi s$ is a required phase shift in degrees from time to time for sequence s.

9. The method of claim 1, wherein the controller is configured to separate the simultaneous directive wavefield data.

10. The method of claim 9, wherein the simultaneous directive wavefield data is separated using an extended generalized matching pursuit technique.

* * * * *